(12) United States Patent
Menon et al.

(10) Patent No.: US 12,556,471 B2
(45) Date of Patent: Feb. 17, 2026

(54) ROUTE COST BASED ON ROUTE METRICS AND PATH TYPE PREFERENCE

(71) Applicant: Juniper Networks, Inc., Sunnyvale, CA (US)

(72) Inventors: Abilash Menon, Boxborough, MA (US); Markus Jork, Andover, MA (US); John M. Peterson, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 18/396,482

(22) Filed: Dec. 26, 2023

(65) Prior Publication Data
US 2025/0007818 A1 Jan. 2, 2025

Related U.S. Application Data

(60) Provisional application No. 63/510,765, filed on Jun. 28, 2023.

(51) Int. Cl.
| | |
|---|---|
| *H04L 45/121* | (2022.01) |
| *H04L 45/02* | (2022.01) |
| *H04L 45/12* | (2022.01) |
| *H04L 45/24* | (2022.01) |

(52) U.S. Cl.
CPC ............ *H04L 45/123* (2013.01); *H04L 45/04* (2013.01); *H04L 45/121* (2013.01); *H04L 45/24* (2013.01)

(58) Field of Classification Search
CPC ..... H04L 45/123; H04L 45/04; H04L 45/121; H04L 45/24; H04L 45/02; H04L 45/124; H04L 45/566; H04L 45/22; H04L 45/28; H04L 45/03; H04L 45/033; H04L 45/036; H04L 45/037; H04L 45/0377; H04L 45/247
See application file for complete search history.

(56) References Cited

U.S. PATENT DOCUMENTS

| | | |
|---|---|---|
| 9,729,439 B2 | 8/2017 | MeLampy et al. |
| 10,200,264 B2 | 2/2019 | Menon et al. |

(Continued)

OTHER PUBLICATIONS

Extended Search Report from counterpart European Application No. 24162219.0 dated Aug. 29, 2024, 8 pp.

(Continued)

*Primary Examiner* — Johnny B Aguiar
(74) *Attorney, Agent, or Firm* — Shumaker & Sieffert, P.A.

(57) ABSTRACT

Techniques are disclosed for computing a cost of an advertised route to a next-hop network device along a path to a destination based at least in part on a preference for the path. In one example, a computing system computes a cost of a route to a next-hop network device along a path to a destination. The computed cost is based at least in part on (1) a metric for the route and (2) a preconfigured preference for the path. In some examples, the preference for the path is based at least in part on (a) a type of the path as compared to other types of other paths to the destination or (b) a latency of the path as compared to other latencies of the other paths. The computing system sends a route advertisement for the route that includes data indicative of the cost of the route.

18 Claims, 13 Drawing Sheets

(56) References Cited

U.S. PATENT DOCUMENTS

| | | | |
|---|---|---|---|
| 2004/0136324 A1* | 7/2004 | Steinberg | H04L 45/302 |
| | | | 370/254 |
| 2018/0062986 A1* | 3/2018 | Murgia | H04L 43/08 |
| 2020/0403890 A1 | 12/2020 | McCulley et al. | |
| 2022/0200887 A1* | 6/2022 | Menon | H04L 45/02 |
| 2023/0059537 A1* | 2/2023 | Gavand | H04L 67/1006 |
| 2023/0116163 A1 | 4/2023 | Scholz et al. | |
| 2023/0353482 A1* | 11/2023 | Means | H04L 45/123 |
| 2024/0305553 A1* | 9/2024 | Vasseur | H04L 43/10 |

OTHER PUBLICATIONS

"Transmission Control Protocol," DARPA Internet Program, RFC 793, Sep. 1981, 91 pp.

Katz et al., "Bidirectional Forwarding Detection (BFD) for IPV4 and IPV6 (Single Hop)," Internet Engineering Task Force (IETF), RFC 5881, Jun. 2010, 7 pp.

Katz et al., "Bidirectional Forwarding Detection (BFD)," Internet Engineering Task Force (IETF), RFC 5880, Jun. 2010, 49 pp.

Menon et al., "Secure Vector Routing (SVR)," Network Working Group Internet-Draft: draft-menon-svr-01, Mar. 29, 2022, 76 pp.

Menon et al., "Secure Vector Routing (SVR)," Network Working Group Internet-Draft: draft-menon-svr-02, Sep. 20, 2022, 96 pp.

Menon et al., "Secure Vector Routing (SVR)," Network Working Group, Internet-Draft: draft-menon-svr-00, Oct. 1, 2021, 37 pp.

Postel, "User Datagram Protocol," ISI, RFC 768, Aug. 28, 1980, 3 pp.

Response to Extended Search Report dated Aug. 29, 2024, from counterpart European Application No. 24162219.0 filed Jun. 25, 2025, 9 pp.

\* cited by examiner

Common Approach

- Have an intent to select a DC based on a per Prefix path preference to determine DC. This will cover all 3 use cases.

Per prefix path preference approach

Application 1 (parent 1)
Prefix : 0.0.0.0/0
Application Policy - SLA
Path preferences (ordered)
a) Mpls -> DC1
b) Mpls -> DC2
c) Broadband -> DC1
d) Broadband -> DC2

Application 2 (parent 2)
Prefix : 200.1.0.0/24
Application Policy - SLA
Path preferences (ordered)
a) Mpls -> DC2
b) Mpls -> DC1
c) Broadband -> DC2
d) Broadband -> DC1

Application 3 (child 1)
Prefix : 80.0.1.0/24
Application Policy - SLA
Path preferences (ordered)
a) Broadband -> DC1
b) Broadband -> DC2

This can be defined like an application – but that needs to be identified as a driver application

FIG. 7A

ROUTE COST BASED ON ROUTE METRICS AND PATH TYPE PREFERENCE

This application claims the benefit of U.S. Provisional Application No. 63/510,765, which was filed on Jun. 28, 2023, the entire content of which is incorporated herein by reference.

TECHNICAL FIELD

This disclosure generally relates to computer networking, and, more specifically, to the routing of network traffic.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the values specified in the source address and source port of the forward packet flow is the same values as specified in the destination address and destination port of the reverse packet flow, and the values specified in the destination address and destination port of the forward packet flow is the same values as specified in the source address and source port of the reverse packet flow.

Alternatively, a session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

Techniques are disclosed for computing a cost of an advertised route to a next-hop network device along a path to a destination based at least in part on a preference for the path. In one example, a computing system, such as a network device, computes a cost of a route to a next-hop network device along a path to a destination. The computed cost is based at least in part on (1) one or more metrics for the route and (2) a preconfigured preference for the path. In some examples, the preference for the path is based at least in part on (a) a type of the path as compared to other types of other paths to the destination or (b) a latency of the path as compared to other latencies of the other paths. In some examples, the preference for the path may be further based on a preference for a particular data center, a particular type of the path, or a path prefix. In some examples, the computing system may be configured to use different preferences for network traffic of different applications. The computing system sends, via a routing protocol, a route advertisement for the route. The route advertisement includes data indicative of the cost of the route.

The techniques of the disclosure may provide specific improvements to the computer-related field of computer networking that have practical applications. For example, the techniques disclosed herein may enable a computing system, such as a branch router, being configured to advertise a cost of a route to a next-hop computing system along each path of a plurality of paths to a destination based on a preference for a type of the respective path. This may enable the branch router to solicit network traffic from spoke routers along a particular desired path. In this fashion, an administrator can configure devices in a network to perform traffic engineering and failover in a more specific and granular way, such as by expressing preferences for paths of a particular type irrespective of the particular geographic data center the path traverses, even where less-desirable paths through a more-preferred data center are available.

In one example, this disclosure describes a computing system comprising processing circuitry and a storage device, wherein the processing circuitry has access to the storage device and is configured to: compute, based at least in part on (1) one or more metrics for a route to a next-hop network device along a path to a destination and (2) a preconfigured preference for the path to the destination, a cost of the route; and send, via a routing protocol, a route advertisement for the route, wherein the route advertisement includes data indicative of the cost of the route.

In another example, this disclosure describes a method comprising: computing, by a computing system and based at least in part on (1) one or more metrics for a route to a next-hop network device along a path to a destination and (2) a preconfigured preference for the path to the destination, a cost of the route; and sending, by the computing system and via a routing protocol, a route advertisement for the route, wherein the route advertisement includes data indicative of the cost of the route.

In another example, this disclosure describes non-transitory, computer-readable media comprising instructions that, when executed, are configured to cause processing circuitry of a computing system to: compute, based at least in part on (1) one or more metrics for a route to a next-hop network device along a path to a destination and (2) a preconfigured preference for the path to the destination, a cost of the route; and send, via a routing protocol, a route advertisement for the route, wherein the route advertisement includes data indicative of the cost of the route.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 7A-7C are conceptual illustrations depicting example definitions for path affinity on a per-application basis, in accordance with aspects of the techniques of the disclosure.

DETAILED DESCRIPTION

Figure 1:
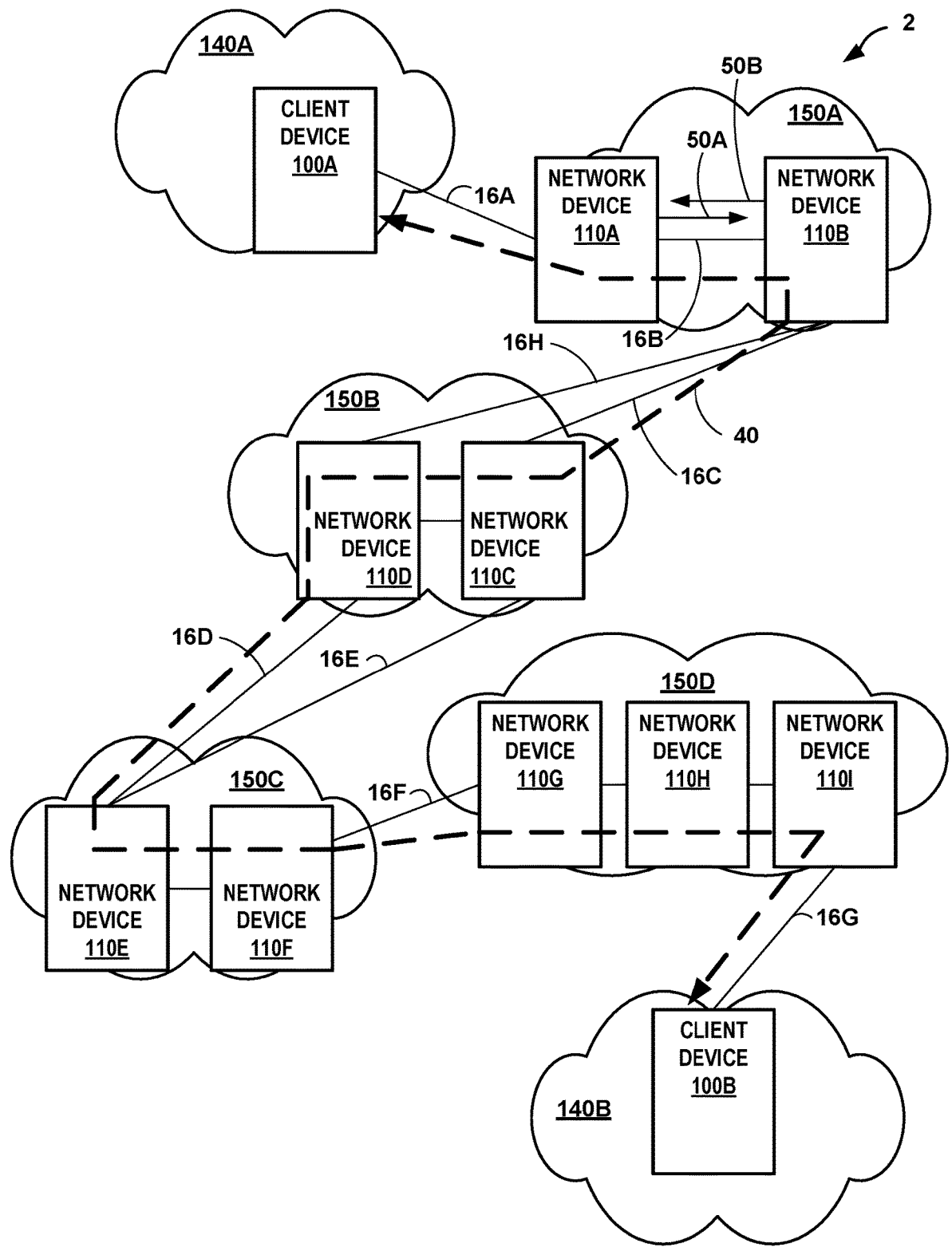
FIG. 1 is a block diagram illustrating an example computer network system in accordance with aspects of the techniques of the disclosure.

FIG. 1 is a block diagram illustrating an example computer network system 2 in accordance with the techniques of the disclosure. In the example of FIG. 1, computer network system 2 includes one or more service provider networks, e.g., service provider networks 150A-150D (collectively, "service provider networks 150") configured to provide Wide Area Network (WAN) connectivity to disparate customer networks 140A-140B (collectively, "customer networks 140"). Network devices 110A-110I (collectively, "network devices 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for ease of illustration, but each of customer networks 140 may include any number of client devices.

In some examples, customer networks 140 may be L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16H (collectively, links "16") may be Ethernet, Asynchronous Transfer Mode (ATM), or any other suitable network connections. In other examples, customer networks 140 may be L3 networks. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Network devices 110 may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional network devices are not shown for ease of explanation, system 2 may include additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, one or more additional network elements may be included along any of network links 16, such that the network elements of system 2 are in communication but not directly coupled.

Each service provider network 150 typically provides residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, network devices 110 may implement a stateful, session-based routing scheme that enables each of network devices 110 to independently perform path selection and traffic engineering. The use of session-based routing may enable network devices 110 to eschew the use of a centralized controller, such as a Software-Defined Networking (SDN) controller to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. In some examples, network devices 110 include Ethernet over SVR (EoSVR) routers.

In the example of FIG. 1, client device 100A of system 2 establishes session 40 (shown with a dashed line) with client device 100B. Network devices 110 facilitate establishment of session 40 by transporting network traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, network devices 110A-110I, and client device 100B.

In some examples, network devices 110 may extend session 40 as an L3 session across service provider networks 150 according to one or more L3 communication session protocols, including Transmission Control Protocol (TCP) or User Datagram Protocol (UDP), etc. For example, to establish session 40 according to TCP such that data may be exchanged according to TCP, client device 100A and client device 100B perform a three-way handshake. Client device 100A sends a first packet comprising a "SYN" flag to client device 100B. Client device 100B acknowledges receipt of the first packet by responding to client device 100A with a second packet comprising a "SYN-ACK" flag. Client device 100A acknowledges receipt of the second packet by responding to client device 100B with a third packet comprising an "ACK" flag. After sending the third packet, session 40 is established according to TCP and client devices 100A, 100B may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B. Session 40 may be considered "established" according to UDP upon receipt by client device 100A of any packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when network device 110A receives a packet for the forward packet flow originating from client device 100A and destined for client device 100B, network device 110A determines whether the packet belongs to a new session (e.g., is the "first" packet or "lead" packet of session 40). In some examples, network device 110A determines whether session information, e.g., a source address, source port, destination address, destination port, and protocol, of the first packet matches an entry in a session table.

If no such entry exists, network device 110A determines that the packet belongs to a new session and creates an entry in the session table. Furthermore, if the packet belongs to a new session, network device 110A may generate a session identifier for session 40. The session identifier may comprise, e.g., a source address and source port of client device 100A, a destination address and destination port of client device 100B, and a protocol used by the first packet. Network device 110A may use the session identifier to identify subsequent packets as belonging to the same session.

In some examples, network devices 110 perform stateful routing for session 40. For example, network devices 110 may forward each packet of the forward packet flow of session 40 sequentially and along the same forward network path. As described herein, the "same" forward path may mean the same network devices 110 that form a segment or at least a portion of the path between a device originating the packet and a device to which the packet is destined (and not necessarily the entire network path between the device originating the packet and the device to which the packet is destined). Further, network devices 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1, a stateful routing session may be established from network device 110A (which may be an ingress router) through intermediary network devices, such as network devices 110B-110H, to network device 110I (which may be an egress router). In this example, network device 110A determines that the first packet is an unmodified packet and the first packet of new session 40. Network device 110A modifies the first packet to include metadata specifying the session identifier. The metadata may, in some examples, be inserted after the header of the modified first packet. The session identifier may include, e.g., the original source address, source port, destination address, destination port, protocol, service, and/or tenant. Network device 110A replaces the header of the modified first packet to specify a source address that is an address of network device 110A, a source port that is a port via which network device 110A forwards the modified first packet toward client device 100B, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with session 40. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, network device 110A may determine that the forward packet flow of session 40 specifies a destination address and destination port assigned to client device 100B. Network device 110A may thereafter store an association between session 40 with the identified network service. As another example, if the source port and/or destination port for session 40 is 80, network device 110A may determine that session 40 is associated with an HTTP service. In other examples, network device 110A may determine that one or more of a source address, source port, destination address, or destination port for session 40 belong to a block of addresses or ports indicative that a particular service is associated with session 40.

In some examples, network device 110A uses the determined network service for session 40 to select a forward path for forwarding the first packet and each subsequent packet of the forward packet flow of session 40 toward client device 100B. In this fashion, network device 110A may perform service-specific path selection to select a network path that best suits the requirements of the service. In contrast to a network topology that uses an SDN controller to perform path selection, each of network devices 110 performs path selection. Further, the use of session-based routing enables each of network devices 110 to make routing decisions at the service- or application-level, in contrast to conventional routers that are only able to make routing decisions at the flow level.

Additionally, network device 110A may store the session identifier for session 40 such that, upon receiving subsequent packets for session 40, network device 110A may identify the subsequent packets as belonging to the same session 40 and forward the subsequent packets along the same path as the first packet. In some examples, upon receiving such subsequent packets, network device 110A may forward the subsequent packets without the metadata specifying the session identifier.

Intermediary network device 110B receives the modified first packet from network device 110A. Network device 110B determines whether the modified first packet includes metadata specifying the session identifier. In response to determining that the modified first packet includes metadata specifying the session identifier, intermediary network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B may determine that the packet belongs to a new session and create an entry in the session table. Furthermore, if the packet belongs to a new session, network device 110B may generate a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this header information may be modified by each preceding network device of network devices 110 as each of network devices 110 forwards the first packet along the forward path. Furthermore, each of network devices 110 may store this header information to identify a previous network device of network devices 110 (or "waypoint") and a next network device of network devices 110 (or "waypoint") such that each of network devices 110 may reconstruct the same forward path and reverse path for each subsequent packet of the session.

Network device 110B may replace the header of the modified first packet to specify a source address that is an address of network device 110B, a source port that is a port via which network device 110B forwards the modified first packet toward client device 100B, a destination address that is an address of the next hop to which network device 110B may forward the first packet (e.g., an address of network device 110C for session 40 along the first path), and a destination port that is a port of the next hop to which network device 110B may forward the first packet (e.g., a port of network device 110C). Network device 110B forwards the modified first packet to network device 110C. Additionally, network device 110B may store the session identifier for the session such that, upon receiving subsequent packets for the session, network device 110B may identify subsequent packets as belonging to the same session and forward the subsequent packets along the same path as the first packet.

Subsequent intermediary network devices, such as network devices 110C-110H, may process the modified first packet in a similar fashion as network devices 110A and 110B such that network devices 110 forward the subsequent packets of the session along the same path as the first packet. Further, each of network devices 110 may store a session identifier for the session, which may include an identification of the previous network device of network devices 110 along the network path. Thus, each of network devices 110 may use the session identifier to forward packets of the reverse packet flow for the session along the same network path back to client device 100A.

A network device of network devices 110 that may forward packets for a forward packet flow of the session to a destination for the packet flow may be called an egress, or "terminus" device. In the foregoing example, network device 110I is a terminus router because network device 110I may forward packets to client device 100B. Network device 110I receives the modified first packet that comprises the metadata specifying the session identifier (e.g., the original source address, source port, destination address, and destination port). Network device 110I determines the modified first packet is destined for a service terminating at network device 110I by determining that the destination source address and destination source port specified in the metadata of the modified lead packet corresponds to a destination reachable by network device 110I (e.g., client device 100B). Network device 110I recovers the original first packet by removing the metadata from the modified first packet and using the metadata to modify the header of the first packet to specify the original source address and source port of client device 100A and destination address and destination port of client device 100B. Network device 110I forwards the recovered first packet to client device 100B. The use of session-based routing may therefore form a series of waypoints (e.g., network devices 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; "Secure Vector Routing (SVR)," draft-menon-svr-00, Internet-Draft, Internet Engineering Task Force (IETF), Oct. 1, 2021, available at https://datatracker.ietf.org/doc/draft-menon-svr/00/; "Secure Vector Routing (SVR)," draft-menon-svr-01, Internet-Draft, Internet Engineering Task Force (IETF), Mar. 29, 2022, available at https://datatracker.ietf.org/doc/draft-menon-svr/01/; and "Secure Vector Routing (SVR)," draft-menon-svr-02, Internet-Draft, Internet Engineering Task Force (IETF), Sep. 20, 2022, available at https://datatracker.ietf.org/doc/draft-menon-svr/02/; the entire contents of each of which is incorporated by reference herein.

Bidirectional Forwarding Detection (BFD) is a network protocol that is used to detect faults in a bidirectional path between two network devices, such as link 16B between network devices 110A and 110B. BFD provides low-overhead, short-duration detection of failures in the link between the two network devices. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, network devices 110A and 110B establish a session over link 16B. Typically, network devices 110A and 110B establish and tear down a BFD session with a three-way handshake. Typically, network devices 110A and 110B may declare link 16B to be operational only after two-way communication is established between network devices 110A and 110B. However, this does not preclude the use of unidirectional links. For example, link 16B may represent a first unidirectional link from network device 110A to network device 110B, and a second unidirectional link from network device 110B to network device 110A.

Once the BFD session is established, network devices 110A and 110B transmit BFD packets periodically over link 16B. Each network device 110A, 110B estimates how quickly it may send and receive BFD packets to negotiate, with the peer network device 110A, 110B how rapidly failure detection may occur. In some examples, network devices 110A and 110B may modify, in real-time, these estimates to adapt to network congestion, changes in latency or bandwidth, or other unusual situations. This may allow for the use of a shared medium between fast network devices and slow network devices, while allowing the fast network devices to detect failures more rapidly while allowing the slow network devices to participate in failure detection.

BFD may operate in two modes: asynchronous mode and demand mode. In asynchronous mode, if one of network devices 110A and 110B stop receiving BFD packets for some amount of time (the length of which is negotiated as described above), network devices 110A and 110B may assume that link 16B (or a component, device, or path forming link 16B) has failed. In demand mode, network devices 110A and 110B may negotiate not to send periodic BFD packets to reduce overhead. This assumes that network devices 110A and 110B have another way to verify connectivity to one another, such as via the physical layer. However, either of network device 110A, 110B may still send BFD packets if needed.

Additionally, either of network device 110A, 110B may use an Echo function. When this function is active, network device 110A, e.g., sends a stream of Echo packets to network device 110B. Network device 110B responds by transmitting the Echo packets back to network device 110A via the forwarding plane of network device 110B. Network device 110A may use the Echo function to test the forwarding path to network device 110B, and vice versa. Additional example information regarding BFD is described in "Bidirectional Forwarding Detection (BFD)," RFC 5880, IETF, June 2010, available at https://datatracker.ietf.org/doc/html/rfc5880; and "Bidirectional Forwarding Detection (BFD) for IPV4 and IPv6 (Single Hop)," RFC 5881, IETF, June 2010, available at https://datatracker.ietf.org/doc/rfc5881/, the entire contents of each of which are incorporated herein by reference.

Network devices 110 create a separate BFD session for each communications path and data protocol in use between two network devices. For example, to perform fault detection along the entire path of session 40 between network device 110A and 110I, a distinct BFD session may be established along each link 16, e.g., such as a first BFD session between network devices 110A and 110B along a first link, a second BFD session between network devices 110B and 110C along link 16C, etc.

In some examples, the use of a dedicated BFD session between two network devices may be infeasible. For example, a hub router may be connected to many spoke routers (e.g., dozens, hundreds, or more routers). If such a hub router were to maintain a dedicated BFD session with each spoke router to which the hub router is connected, BFD packets sent and received by the hub router may consume a large amount of network resources. Accordingly, the use of dedicated BFD sessions may consume network resources that could otherwise be used for sending and receiving customer traffic.

In some examples, to reduce the consumption of network resources used for performance monitoring, network devices 110 may use in-flow performance monitoring. For example, each network device 110 may modify packets carrying customer data for a session between client devices 100 to include metadata comprising performance information. For example, a session between client device 100A and client device 100B comprises a forward flow originating from client device 100A and destined for client device 100B and a reverse flow originating from client device 100B and destined for client device 100A. Network device 110A receives, from client device 100A, a first packet of the forward flow, the first packet comprising a header and a data payload. Network device 110A modifies the first packet to further include metadata comprising first performance information and forwards the modified first packet to network device 110B. Network device 110B may obtain the first performance information from the metadata of the first packet. Further, network device 110B may remove the metadata and forward the first packet toward client device 100B (e.g., by forwarding the packet to network device 110C).

Additionally, network device 110B receives, from client device 100B, a second packet of the reverse flow, the second packet comprising a header and a data payload. Network device 110B modifies the second packet to further include metadata comprising second performance information and forwards the modified second packet to network device 110A. Network device 110A may obtain the second performance information from the metadata of the second packet.

Further, network device 110A may remove the metadata and forward the second packet toward client device 100A.

In some examples, the metadata comprises a BFD packet. In some examples, the metadata comprises a timestamp that network devices 110A, 110B may use to determine performance information. In some examples, the metadata comprises a measure of network performance, such as a measure of latency, jitter, packet loss, bandwidth, etc. For example, network device 110A modifies a first packet of a forward flow to include metadata specifying a first timestamp indicative of a time at which network device 110A forwards the first packet toward network device 110B. Network device 110B modifies a second packet of a reverse flow to include metadata specifying a second timestamp indicative of a time at which network device 110B received the first packet from network device 110A and/or a third timestamp indicative of a time at which network device 110B forwards the second packet toward network device 110A. Network device 110A and 110B may exchange a plurality of such modified packets to obtain multiple datapoints regarding the performance of link 16B between network device 110A and 110B. Network device 110A, for example, may process the multiple timestamps to generate metrics for link 16B between network device 110A and 110B, such as latency, jitter, packet loss, bandwidth, etc. In this fashion, network devices 110A and 110B may conduct performance monitoring of link 16B without interrupting customer traffic between client devices 100 or consuming additional network resources through the use of dedicated BFD sessions for performance monitoring.

Additional information with respect to performance monitoring is described in U.S. Patent Application Publication No. 2020/0403890, entitled "IN-LINE PERFORMANCE MONITORING," published on Dec. 24, 2020; U.S. Pat. No. 10,200,264, entitled "LINK STATUS MONITORING BASED ON PACKET LOSS DETECTION," issued on Feb. 5, 2019; and U.S. patent application Ser. No. 17/449,311, filed on Sep. 29, 2021, entitled "OPPORTUNISTIC MESH FOR SOFTWARE-DEFINED WIDE AREA NETWORK (SD-WAN)," the entire content of each of which is incorporated herein by reference in its entirety.

In accordance with the techniques of the disclosure, a network device, such as one of network devices 110 of FIG. 1, compute a cost of an advertised route to a next-hop network device along a path to one or more destinations based at least in part on a preference for the path.

For example, with respect to FIG. 1, and as discussed previously, session 40 comprises a forward packet flow 50A originating from client device 100A and destined for client device 100B and a reverse packet flow 50B originating from client device 100B and destined for client device 100A. Network device 110B may have two (or more) paths along which to forward packets of forward packet flow 50A. A first path to client device 100B exists from network device 110B, traversing link 16C, to network device 110C, traversing link 16E, to network device 110E, and then network devices 110F-110I. A second path to client device 100B exists from network device 110B, traversing link 16H, to network device 110D, traversing link 16D, to network device 110E, and then network devices 110F-110I. In some examples, the first path may be a Multiprotocol Label Switching (MPLS) path and the second path may be a broadband path.

Network device 110C computes a cost of a first route to a next-hop network device (e.g., network device 110E) along the first path to the destination (client device 100B). The computed cost is based at least in part on (1) a metric for the route and (2) a preconfigured preference for the path. The metric may include one or more of a latency, a jitter, or a packet loss of link 16E to network device 110E.

In some examples, the preference for the path is based at least in part on a type of the path as compared to other types of other paths to client device 100B. For example, MPLS-type paths may be more preferred and broadband-type paths may be less preferred. In some examples, the preference for the first path is based at least in part on a latency of the first path to client device 100B as compared to other latencies of the other paths to client device 100B (e.g., the second path). Network device 110C sends, via a routing protocol, a route advertisement for the first route to network device 110B. The route advertisement includes data indicative of the cost of the route. In some examples, the routing protocol is BGP.

Network device 110D may compute a cost of a second route to a next-hop network device (e.g., network device 110E) along the second path to the destination (client device 100B) in a similar fashion. Network device 110D sends, via the routing protocol, a route advertisement for the second route to network device 110B. Because the first path is more preferred than the second path, the advertised cost of the first route is less than the advertised cost of the second route.

Network device 110B, upon receiving packets of forward packet flow 50A, identifies client device 100B as a destination for the packets of forward packet flow 50A. Network device 110B uses the route advertisement for the first route from network device 110C and the route advertisement for the second route from network device 110D to select a lowest-cost route for forwarding the packets of forward packet flow 50A. Therefore, because the preference for the particular path is factored into the computation of the costs of the first and second routes, network device 110B determines to use the first path for forwarding packets of forward packet flow 50A and forwards the packets of forward packet flow 50A to network device 110C.

Figure 2:
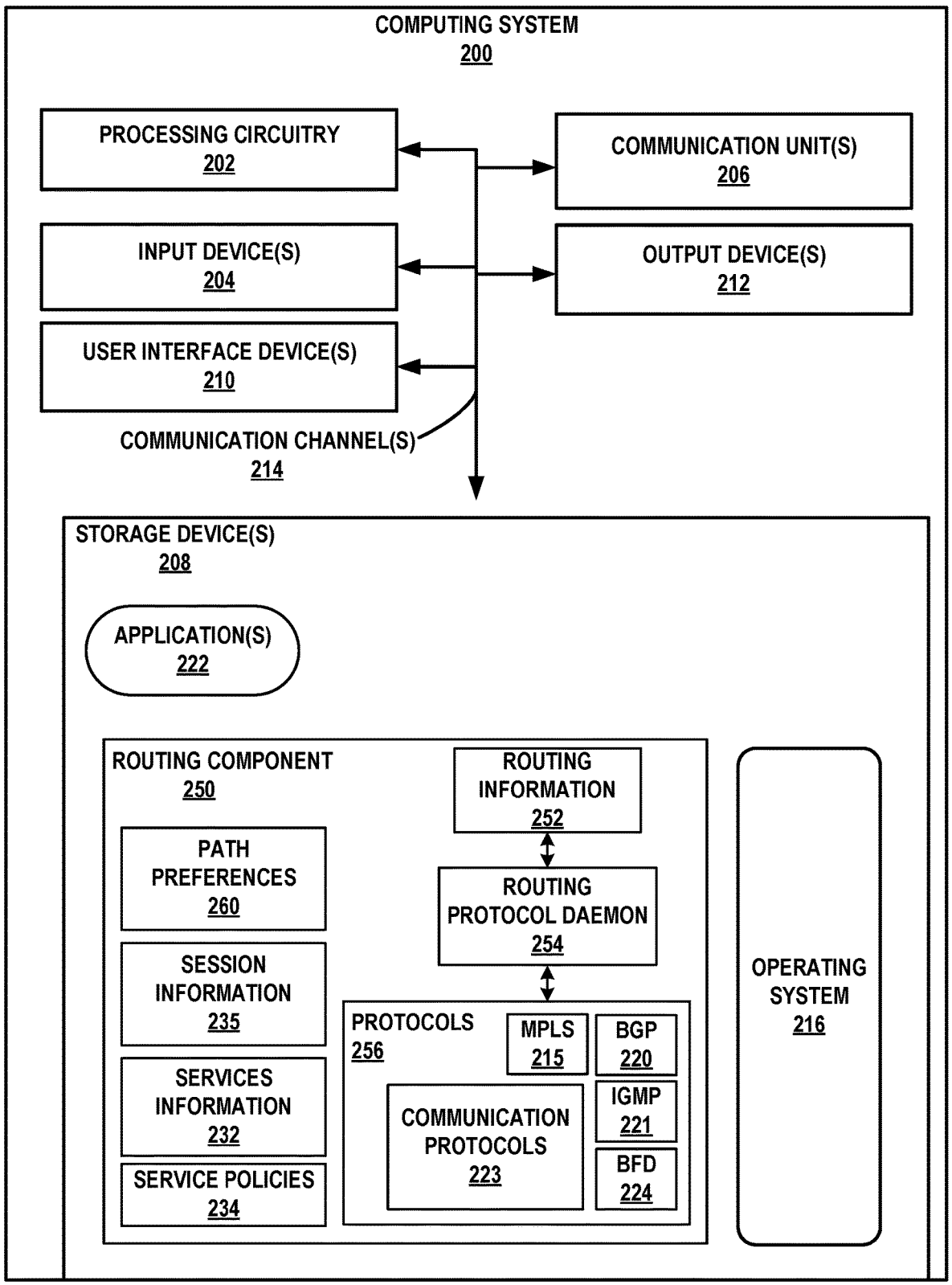
FIG. 2 is a block diagram illustrating an example computing system in accordance with aspects of the techniques of the disclosure.

FIG. 2 is a block diagram illustrating an example computing system 200 in accordance with the techniques of the disclosure. In general, computing system 200 may be an example implementation of one of network devices 110 of FIG. 1. Computing system 200 includes processing circuitry 202 for executing any one or more of applications 222, routing component 250, or any other computing device described herein. Other examples of computing system 200 may be used in other instances to implement the techniques of the disclosure.

Although shown in FIG. 2 as a stand-alone computing system 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing system 200 may be implemented as a virtualized network function (VNF). In some examples, one or more aspects of computing system 200 can be run as one or more containers or as one or more applications within virtual machines of a Network Functions Virtualization (NFV) platform using, e.g., virtual input and output (VirtIO) and single root input/output virtualization (SR-IOV) network virtualization technologies, or on bare-metal servers. In some examples, computing system 200 is a physical network device, such as a switch, router, gateway, or other device that sends and receives network traffic. Computing system 200 may be a distributed system, in some examples.

As shown in the example of FIG. 2, computing system 200 includes processing circuitry 202, one or more input device(s) 204, one or more communication unit(s) 206, one or more output device(s) 212, one or more storage device(s) 208, and one or more user interface (UI) device(s) 210. Computing system 200, in one example, further includes one or more application(s) 222 and operating system 216 that are executable by computing system 200. Each of components 202, 204, 206, 208, 210, and 212 are coupled (physically, communicatively, and/or operatively) for inter-component communications. In some examples, communication channel(s) 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing system 200. In some examples, processing circuitry 202 comprises one or more hardware-based processors. For example, processing circuitry 202 may have access to storage device 208 and may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage device(s) 208 may be configured to store information within computing system 200 during operation. Storage device(s) 208, in some examples, is described as a computer-readable storage medium. In some examples, storage device(s) 208 include a temporary memory, meaning that a primary purpose of storage device 208 is not long-term storage. Storage device(s) 208, in some examples, include a volatile memory, meaning that storage device(s) 208 does not maintain stored contents when the computer is turned off. Examples of volatile memories include random access memories (RAM), dynamic random access memories (DRAM), static random access memories (SRAM), and other forms of volatile memories. In some examples, storage device(s) 208 stores program instructions for execution by processing circuitry 202. Storage device(s) 208, in one example, are used by software or applications running on computing system 200 to temporarily store information during program execution.

Storage device(s) 208, in some examples, also include one or more computer-readable storage media. Storage device(s) 208 may be configured to store larger amounts of information than volatile memory. Storage device(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 200, in some examples, also includes one or more communication unit(s) 206. Computing system 200, in one example, utilizes communication unit(s) 206 to communicate with external devices via one or more networks, such as one or more wired/wireless/mobile networks. Communication unit(s) 206 may include a network interface, such as an Ethernet card, an optical transceiver, a radio frequency transceiver, or any other type of device that can send and receive information. Other examples of such network interfaces may include 3G/4G/5G and WiFi radios. In some examples, communication unit(s) 206 may include a plurality of high-speed network interface cards. In some examples, computing system 200 uses communication unit(s) 206 to communicate with an external device. For example, computing system 200 uses communication unit(s) 206 to communicate with other network devices 110 and/or client devices 100 of FIG. 1 via links 16 of FIG. 1 with which communication unit(s) 206 are connected.

Computing system 200, in one example, also includes one or more user interface device(s) 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing system 200.

One or more output device(s) 212 may also be included in computing system 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device(s) 212 include a speaker, a cathode ray tube (CRT) monitor, a liquid crystal display (LCD), or any other type of device that can generate intelligible output to a user.

Computing system 200 may include operating system 216. Operating system 216, in some examples, controls the operation of components of computing system 200. For example, operating system 216, in one example, facilitates the communication of one or more applications 222 with processing circuitry 202, communication unit(s) 206, storage device(s) 208, input device(s) 204, user interface device(s) 210, and output device(s) 212. Applications 222 may also include program instructions and/or data that are executable by computing system 200.

In some examples, processing circuitry 202 executes routing component 250, which determines routes of received packets and forwards the packets accordingly. Routing component 250 may communicate with other network devices, e.g., such as network devices 110 of FIG. 1, to establish and maintain a computer network, such as computer network system 2 of FIG. 1, for transporting network traffic between one or more customer devices. Routing protocol daemon (RPD) 254 of routing component 250 may execute software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols 223, such as TCP, UDP, TLS, or ICMP. Protocols 256 additionally includes BFD 224.

Routing information 252 may describe a topology of the computer network in which computing system 200 resides, and may also include routes through the shared trees in the computer network. Routing information 252 may describe various routes within the computer network, and the appropriate next hops for each route, e.g., the neighboring routing devices along each of the routes. Routing information 252 may be programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In some examples, computing system 200 may operate as any of network devices 110 of FIG. 1. With reference to FIG. 2, in the following example, computing system 200 operates as network device 110A. Computing system 200 receives, via communication unit(s) 206, a packet from client device 100A destined for client device 100B. In response to receiving the packet, computing system 200 generates an L3 packet comprising an L3 header and metadata comprising a source IP address and a source port of client device 100A and a destination IP address and a destination port of client device 100B.

In some examples, the metadata comprises a session identifier. The session identifier is a unique identifier for a session comprising a first packet flow originating from a first client device (e.g., client device 100A) and destined for a second client device (e.g., client device 100B) and a second packet flow originating from the second client device and destined for the first client device. Typically, the session identifier comprises a 5-tuple, e.g., the source IP address and the source port of the first client device, the destination IP address and the destination port of the second client device, and a network protocol used by the session.

In this example, the packet is a first packet of a plurality of packets for the session. In response to receiving the first packet, computing system 200 may generate a session identifier for the session between client device 100A and client device 100B and store the session identifier in session information 235 (e.g., so as to store the metadata of the L3 packet). Computing system 200 may generate, based on the first packet, the L3 packet comprising the L3 header and the metadata, as described above. Computing system 200 forwards, via communication unit(s) 206, the L3 packet toward the next-hop network device, network device 110B.

For subsequent packets, computing system 200 may determine, based on information of the subsequent packets (e.g., 5-tuple), that the subsequent packets belong to the same session as the first packet. For example, in response to receiving a second packet for the session, computing system 200 may perform a lookup of session information 235 and determine, based on the source address, source port, destination address, destination port, and/or protocol specified by the second packet, that the second packet belongs to a session having a corresponding entry within session information 235.

In response to determining that the subsequent packets belong to the same session as the first packet, computing system 200 may generate, for the subsequent packets, subsequent L3 packets that include the L3 header but do not include the metadata (as the session identifier associated with a given session is already stored by, e.g., each subsequent network device receiving the first packet).

Computing system 200 may forward the subsequent L3 packets toward the same next-hop network device 110B. Intermediary network devices (e.g., network devices 110B-110H) may receive the subsequent L3 packets and identify, from the L3 header of the subsequent L3 packets, the session associated with the subsequent L3 packets, and use the stored metadata to perform session-based routing of the subsequent L3 packets. In this fashion, computing system 200 may only modify the first L3 packet of the plurality of L3 packets generated for the session to include the metadata, thereby avoiding including the metadata within every packet of the plurality of L3 packets generated for the session while still ensuring that each L3 packet of the plurality of L3 packets is forwarded along the same path (e.g., to the same next-hop network device 110) and that the original packet may be recovered from the L3 packet by an egress network device, such as network device 110I.

With reference to FIG. 2, in the following example, computing system 200 operates as network device 110I and receives an L3 packet modified as described above from network device 110H. For example, computing system 200 receives, via communication unit(s) 206, the L3 packet comprising the L3 header and the metadata.

If the L3 packet is a first L3 packet of a plurality of L3 packets for the session, computing system 200 may use the metadata to generate a session identifier for the session between client device 100A and client device 100B and store the session identifier in session information 235 (e.g., so as to store the metadata of the L3 packet). In response to determining the packet is destined for a client device coupled to network device 110I, computing system 200 may use the metadata of the L3 packet to recover the original packet. For example, computing system 200 may use the metadata to modify the header of the packet to specify the original source address, source port, destination address, and destination port. Computing system 200 then forwards the recovered packet to client device 100B.

Computing system 200 may further receive subsequent L3 packets of the plurality of L3 packets that do not include the metadata. For these subsequent L3 packets, computing system 200 may determine, based on the L3 header (e.g., the source IP address and source port of a previous-hop network device and the destination IP address and destination port of network device 110I), that the subsequent L3 packets belong to the same session as the first L3 packet. Computing system 200 may determine the original destination port and destination address of the packet from the stored metadata for the first L3 packet. Computing system 200 may forward, via communication unit(s) 206, the subsequent packets to client device 100A. In this fashion, computing system 200 may receive only a first L3 packet that specifies the metadata, while subsequent L3 packets do not include such information. Thereby, network devices 110 as described herein may avoid including the metadata within every packet of the plurality of L3 packets generated for the session while still ensuring that each L3 packet of the plurality of L3 packets is forwarded along the same path (e.g., to the same next-hop network device 110).

In accordance with the techniques of the disclosure, path preferences 260 of routing component 250 store preferences for different paths. In some examples, path preferences 260 store, for each path of a plurality of paths, a path identifier, a type of the path, and a preference for the type of path. In some examples, the type of the path may be an MPLS, broadband, Long Term Evolution (LTE), 5G wireless, or other type of networking path. In some examples, path preferences 260 stores, for each path of a plurality of paths, a latency of the path.

Routing component 250 computes, for each path to a destination, a cost of a route to a next-hop network device along the path. The computed path is based at least in part on one or more metrics for the route to the next-hop network device along the path. Further, the computed path is based at least in part on a preconfigured preference for the path to the destination. For example, routing component 250 obtains one or more metrics for the route to the next-hop network device. Routing component 250 determines, based at least in part on the one or more metrics for the route to the next-hop network device, a cost of the route. Routing component 250 adjusts, based at least in part on the preconfigured preference for the path to the destination; the cost of the route.

In some examples, the preconfigured preference for the path comprises a preconfigured preference for a path type of the path in comparison to path types of other paths to the destination. In some examples, the preconfigured preference for the path is based on a latency of the path to the destination in comparison to latencies of other paths to the destination. In some examples, the preference is an ordering of paths to the same destination according to a latency of each path.

Routing component 250 sends, via a routing protocol, a route advertisement for the route. The route advertisement includes data indicative of the cost of the route.

In some examples, routing component 250 computes the cost of a route for a first path as described above and sends the advertisement for the route in response to detecting a failure of a second path to the destination. This may enable a network device receiving the route advertisement to perform failover of the failed second path so as to fail network traffic over to the most-preferred path that remains after the second path failure. Typically, at least one network device forming the first path is different from at least one network device forming the second path.

In some examples, routing component 250 computes a cost of each of a plurality of routes, each route to a respective next-hop network device along a respective path of a plurality of different paths to the destination. The plurality of paths traverse a plurality of geographically separate data centers. The cost of each route of the plurality of routes is based at least in part on (1) one or more metrics for the route to the respective next-hop network device along the respective path of the plurality of paths to the destination and (2) a preconfigured preference for the respective path of the plurality of paths to the destination.

In some examples, routing component 250 determines, based at least in part one or more first metrics for a first route to a first next-hop network device along a first path to the destination, a first cost of the first route. Routing component 250 determines, based at least in part one or more second metrics for a second route to a second next-hop network device along a second path to the destination, a second cost of the second route. In this example, the first cost of the first route is greater than the second cost of the second route.

Routing component 250 adjusts, based at least in part on a preconfigured preference for the first path to the destination, the first cost of the first route and adjusts, based at least in part on a preconfigured preference for the second path to the destination, the second cost of the second route. In this example, the preconfigured preference for the first path indicates that the first path is more preferred and the preconfigured preference for the second path indicates that the second path is less preferred. Furthermore, the adjusted first cost of the first route is less than the adjusted second cost of the second route. Therefore, a network device receiving advertisements for the first and second route may elect to forward network traffic along the first route due to the first route being more preferred than the second route, even though the performance of the first route may be worse than the performance of the second route as indicated by the metrics of the first and second route considered in isolation.

Figure 3:
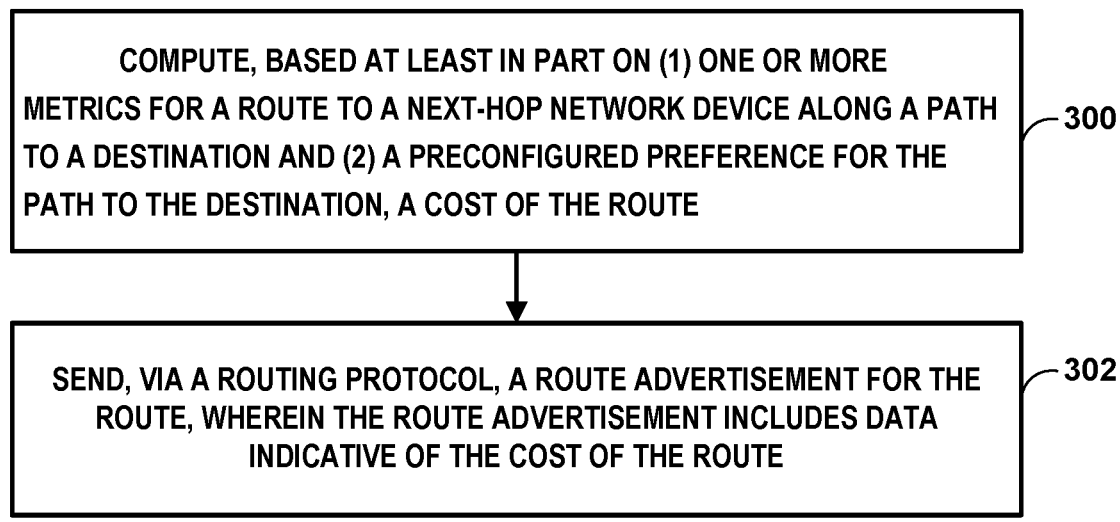
FIG. 3 is a flowchart illustrating an example operation in accordance with aspects of the techniques of the disclosure.

FIG. 3 is a flow diagram illustrating an example operation in accordance with the techniques of the disclosure. FIG. 3 is described with respect to FIG. 1 for convenience.

For example, with respect to FIG. 1, and as discussed previously, session 40 comprises a forward packet flow 50A originating from client device 100A and destined for client device 100B and a reverse packet flow 50B originating from client device 100B and destined for client device 100A. Network device 110B may have two (or more) paths along which to forward packets of forward packet flow 50A. A first path to client device 100B exists from network device 110B, traversing link 16C, to network device 110C, traversing link 16E, to network device 110E, and then network devices 110F-110I. A second path to client device 100B exists from network device 110B, traversing link 16H, to network device 110D, traversing link 16D, to network device 110E, and then network devices 110F-110I. In some examples, the first path may be a Multiprotocol Label Switching (MPLS) path and the second path may be a broadband path.

As depicted in the example of FIG. 3, network device 110C computes a cost of a first route to a next-hop network device (e.g., network device 110E) along the first path to the destination (client device 100B) (300). The computed cost is based at least in part on (1) a metric for the route and (2) a preconfigured preference for the path. The metric may include one or more of a latency, a jitter, or a packet loss of link 16E to network device 110E.

In some examples, the preference for the path is based at least in part on a type of the path as compared to other types of other paths to client device 100B. For example, MPLS-type paths may be more preferred and broadband-type paths may be less preferred. In some examples, the preference for the first path is based at least in part on a latency of the first path to client device 100B as compared to other latencies of the other paths to client device 100B (e.g., the second path).

Network device 110C sends, via a routing protocol, a route advertisement for the first route to network device 110B (302). The route advertisement includes data indicative of the cost of the route. In some examples, the routing protocol is BGP.

Figure 4A:
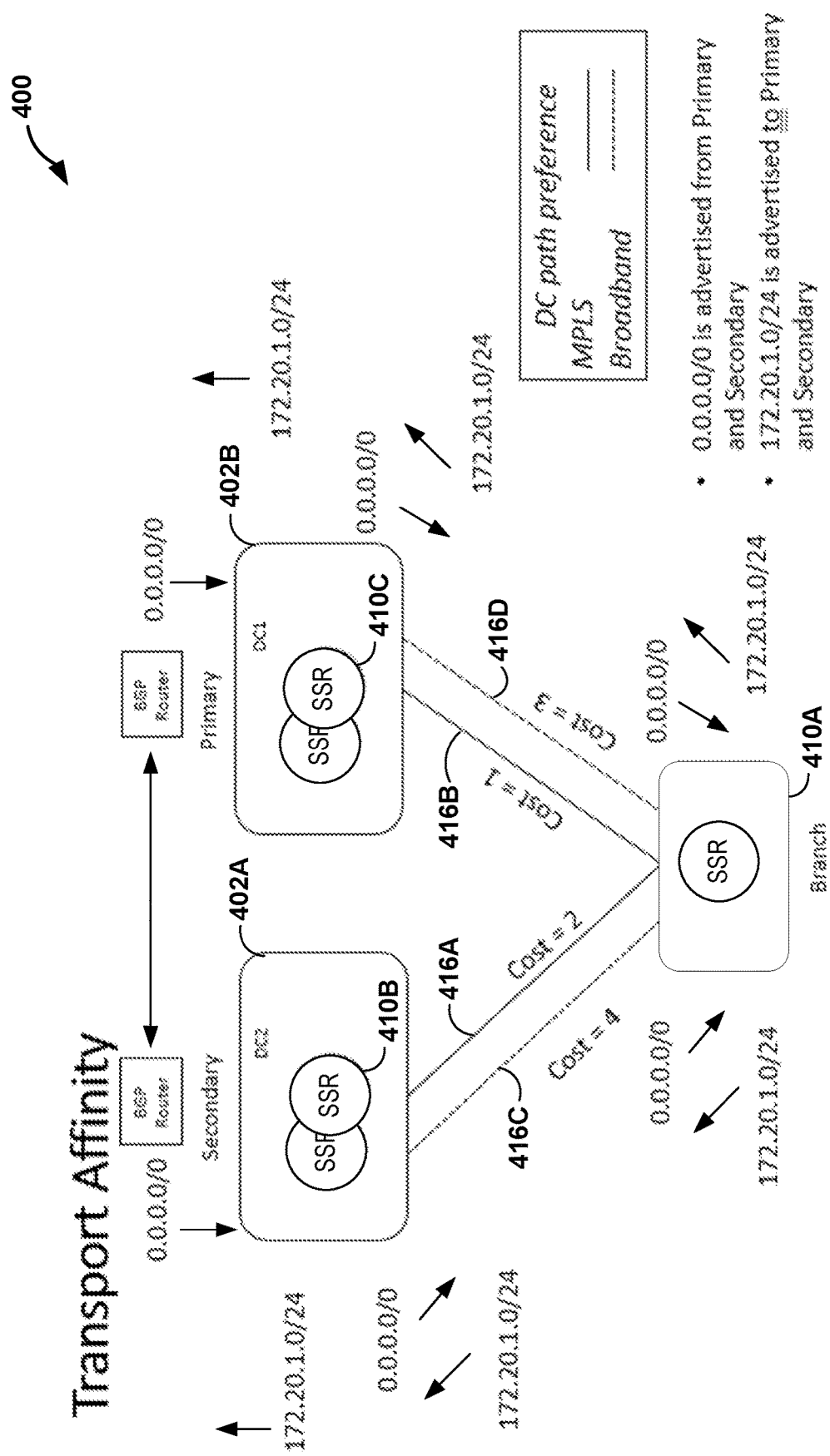
FIGS. 4A-4B are block diagrams illustrating an example computer network system in accordance with aspects of the techniques of the disclosure.
Figure 4B:
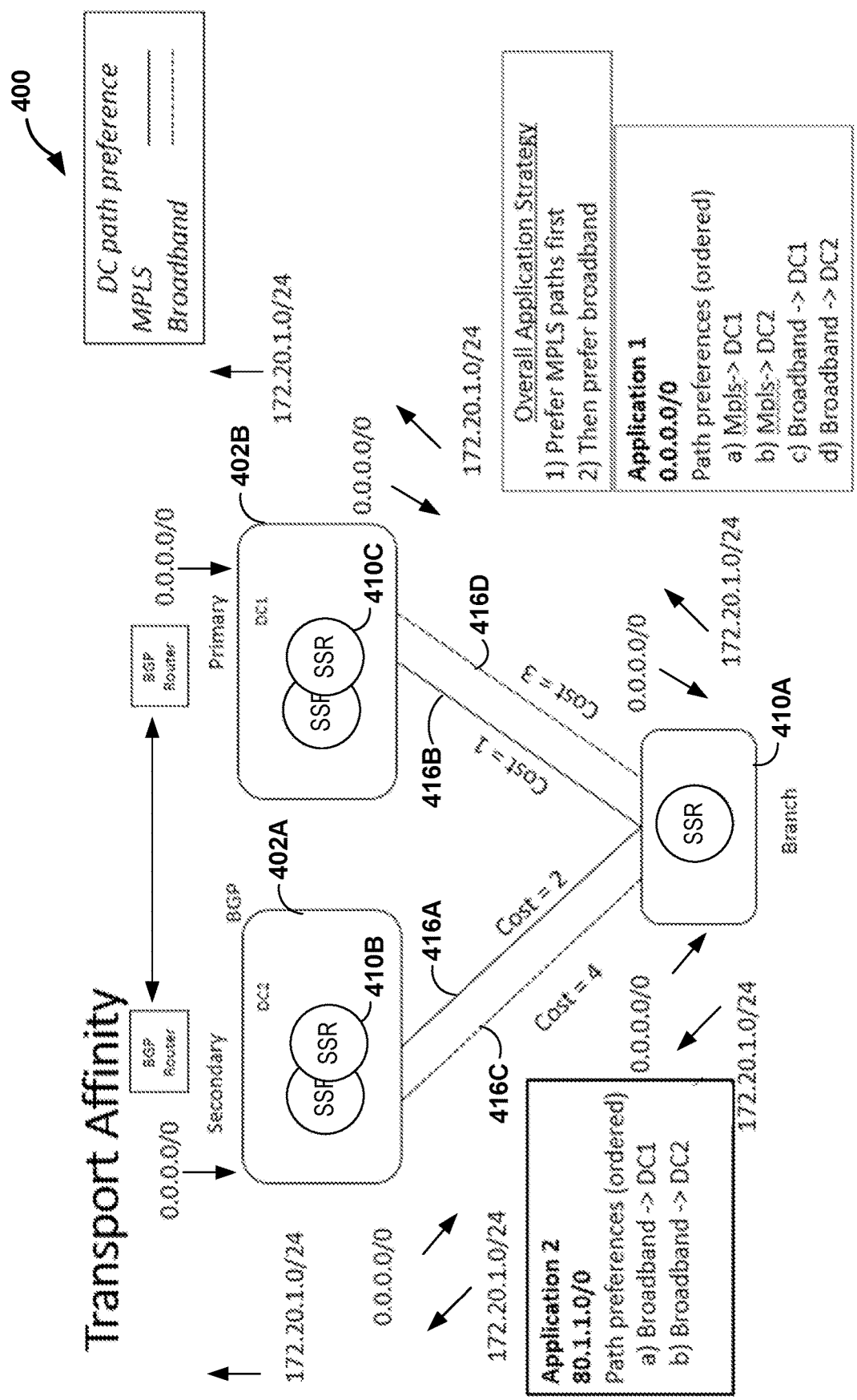

FIGS. 4A-4B are block diagrams illustrating an example computer network system 400 in accordance with the techniques of the disclosure. More specifically, FIG. 4A illustrates an example where network devices 110 express a preference for a path according to a transport affinity, in accordance with the techniques of the disclosure. FIG. 4B illustrates an example where network devices 110 express a preference for a path according to a transport affinity on a per-application basis, in accordance with the techniques of the disclosure.

As depicted in the example of FIG. 4A, computer network system 400 includes branch network device 410A, peer network device(s) 410B within data center 402A, and peer network device(s) 410C within data center 402B. Branch network device 410A is connected to peer network device(s) 410B within data center 402A via MPLS path 416A and broadband path 416C. Branch network device 410A is connected to peer network device(s) 410C within data center 402B via MPLS path 416B and broadband path 416D (paths 416A-416D are collectively referred to as "paths 416"). In some examples, branch network device 410A may be multi-homed to a plurality of peer network devices in data center 402A, data center 402B, or both data centers 402A and 402B.

Typically, a customer may prefer data center 402B to be selected over data center 402A when routing network traffic to a destination. The peer network devices 410B, 410C and branch network device 410A may advertise, via BGP, the available routes through each respective data center 402A, 402B, with the corresponding MPLS path 416A, 416B indicated as a primary path and the corresponding broadband path 416C, 416D indicated as a secondary path. Therefore, during normal operation, branch network device 410A selects MPLS path 416B for forwarding packets of a forward packet flow to, e.g., peer network device 410C of data center 402B, while peer network device 410C selects MPLS path 416B for forwarding packets of the reverse packet flow to branch network device 410A.

In some circumstances, MPLS path 416B to data center 402B may fail. Branch network device 410A may (1) fail over the forward packet flow to broadband path 416D to data center 402B as a secondary path; or (2) use MPLS path 416A provided by data center 402A.

With respect to option (1) above, if broadband path 416D is still operational, BGP communication may continue. Therefore, branch network device 410A and peer network device(s) 410C may fail over the forward packet flow and reverse packet flow from MPLS path 416B of data center 402B (e.g., the primary path) to broadband path 416D of data center 402B (e.g., the secondary path). However, the use of broadband path 416D may be slower or less reliable than using MPLS path 416A provided by data center 402A.

Alternatively, with respect to option (2) above, branch network device 410A may choose to use MPLS path 416A to peer network device(s) 410B provided by data center 402A for the packets of the forward packet flow. However, because data center 402B is configured to be preferred over data center 402A and the secondary route of data center 402B (e.g., broadband path 416D) is still active, peer network device(s) 410B may forward packets to peer network device(s) 410C so as to continue to use broadband path 416D as a secondary route to the failed primary route (MPLS path 416B) of preferred data center 402B, rather than migrating to use of MPLS path 416A through data center 402A. The mismatch between branch network device 410A using MPLS path 416A through data center 402A and peer network device(s) 410C using broadband path 416D through data center 402B may form a loop, which may increase latency, cause branch network device 410A to not recognize the reverse packet flow received from the peer network device(s) 410C, induce Network Address Translation (NAT) errors, or other problems.

Based on the best path, branch network device 410A needs to manipulate the advertisement of 172.20.1.0/24 so that data center packets come to the path which is preferred based on path preferences. With respect to FIG. 4A, though the route 0.0.0.0/0 is advertised from both data centers 402A, 402B, it is desirable for peer network device(s) 410B, 410C to prefer the data center which has the best path preference. Conventionally, there is not a way to indicate this intent. This is a higher-level intent and not just based on each application. Once the data center is selected, traffic for applications follows the respective path preference for the application.

As depicted in the example of FIG. 4B, in accordance with the techniques of the disclosure, branch network device 410A, which may perform session-based routing, may account for a preference for a particular path type when computing a cost of a route to a next-hop network device 410B, 410C along the path for route advertisement via a routing protocol, such as BGP. Furthermore, in the example of FIG. 4B, branch network device 410A may apply a preference for a particular path type on a per-application basis, such that network traffic of each application type of a plurality of different application types may be assigned a corresponding path type preference.

For example, branch network device 410A may be connected to a destination via multiple data centers 402A, 402B. Each respective data center 402A, 402B may include multiple peer network devices 410B, 410C, wherein each peer network device 410B, 410C provides, to branch network device 410A, a separate path 416A, 416B, 416C, and 416D to the destination, each path traversing a plurality of different network devices. Furthermore, each path may be of a different type, such as MPLS, LTE, or broadband. All of the paths across the different data centers may be organized into groups of paths according to path type, irrespective of the particular data center each path traverses.

In operation, a network device, such as branch network device 410A, determines one or more available paths 416 to a destination as well as a preference for each determined path 416. The paths 416 may include, e.g., a path traversing different peer routers of a data center 402A, 402B or traversing different data centers 402A, 402B. For each determined path 416, branch network device 410A computes one or more metrics (e.g., packet loss, latency, jitter) for a route to a next-hop network device 410B, 410C along the path 416 and computes a cost for the route based on the one or more metrics. Branch network device 410A adjusts the cost of the route based on a preference for the path type of the corresponding path 416 for the route. Branch network device 410A advertises, via a routing protocol such as BGP, a route for the next-hop network device 410B, 410C along the path that includes information specifying the adjusted cost of the route.

Therefore, each application may follow the above overall strategy to determine a data center 402, and then use the computed cost to select a best path to that data center. Furthermore, different applications may have different preferences. For example, an application may define a path prefix of 200.0.1.0/24, and, in order of most-preferred to least-preferred, specify MPLS path 416B to data center 402B, MPLS path 416A to data center 402A, broadband path 416D to data center 402B, and broadband path 416D to data center 402A. In short, each application may have a different path preference. A high-level path preference may determine the data center 402 to be selected. In the alternative, a driver application may be used to select the path preference for a given application. Once a data center for the network traffic for an application is determined, the application path preferences are honored. Additional detail with respect to driver applications is discussed subsequently with respect to FIG. 7A.

In this fashion, the techniques of the disclosure may enable a network device to preferentially failover bi-directional network traffic across a path of a more-preferred type prior to attempting to use a path of a second, less-preferred path type. For example, a customer may desire MPLS paths to be used before broadband paths, regardless of the particular data center to or through which the MPLS path traverses. The techniques of the disclosure may enable the customer to fail over both a forward packet flow and a reverse packet flow from a first MPLS path through a first data center to a second MPLS path through a second data center prior to failing over to a broadband path through the first data center.

Figure 5A:
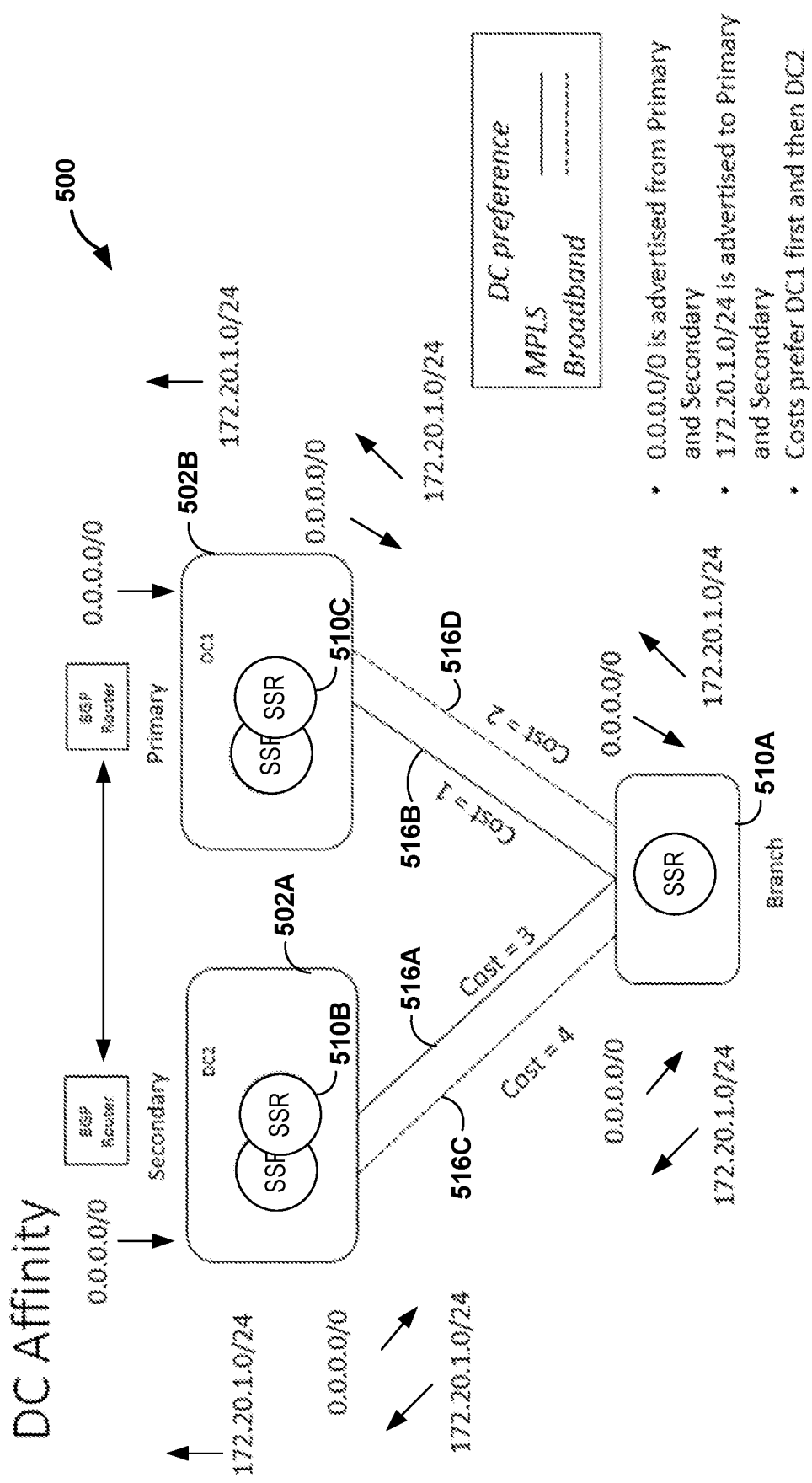
FIGS. 5A-5B are block diagrams illustrating an example computer network system in accordance with aspects of the techniques of the disclosure.
Figure 5B:
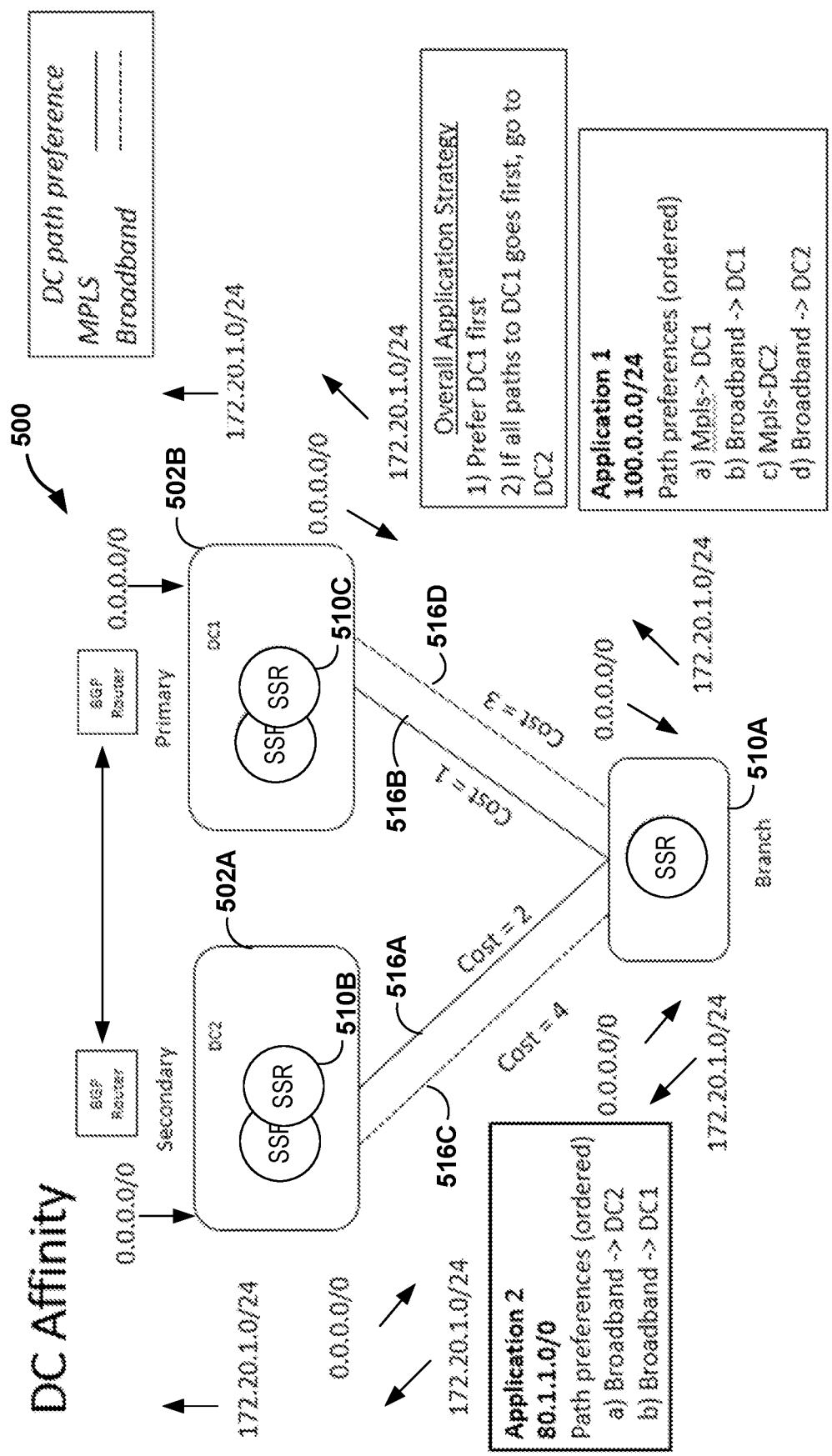

FIGS. 5A-5B are block diagrams illustrating an example computer network system 500 in accordance with the techniques of the disclosure. More specifically, FIG. 5A illustrates an example where network devices 110 express a preference for a path according to a data center affinity, in accordance with the techniques of the disclosure. FIG. 5B illustrates an example where network devices 110 express a preference for a path according to a data center affinity on a per-application basis, in accordance with the techniques of the disclosure.

As depicted in the example of FIG. 5A, computer network system 500 includes branch network device 510A, peer network device(s) 510B within data center 502A, and peer network device(s) 510C within data center 502B. Branch network device 510A is connected to peer network device(s) 510B within data center 502A via MPLS path 516A and broadband path 516C. Branch network device 510A is connected to peer network device(s) 510C within data center 502B via MPLS path 516B and broadband path 516D (paths 516A-516D are collectively referred to as "paths 516").

Based on the data center affinity, branch network device 510 may manipulate the advertisement of prefix 172.20.1.0/24 so that data center packets come to the hub which is the preferred data center. Even though the address 0.0.0.0/0 is advertised from both data centers 502A, 502B, branch network device 510 prefers the data center which is primary. Conventionally, there is not a way to indicate this intent. This is a higher-level intent and not just based on each application. Once the data center is selected, traffic for applications follows the respective path preference for the application.

As depicted in the example of FIG. 5B in accordance with the techniques of the disclosure, branch network device 510A, which may perform session-based routing, is configured to account for a preference for a particular data center when computing a cost of a route to a next-hop network device 510B, 510C along the path for route advertisement via a routing protocol, such as BGP. Furthermore, in the example of FIG. 5B, branch network device 510A may apply a preference for a particular data center on a per-application basis, such that network traffic of each application type of a plurality of different application types may be assigned a corresponding data center preference. In the example of FIG. 5B, branch network device 510A is configured in accordance with the techniques of this disclosure and may be a computing system such as computing system 200 of FIG. 2.

Therefore, in the example of FIG. 5B, branch network device 510A may account for a preference for a particular data center for each application to select a preferred data center 502, and then use the computed cost to select a best path to that data center. Furthermore, different applications may have different preferences. Branch network device 510A may use a higher-level path preference to determine the primary data center of data centers 502A, 502B. Once branch network device 510A determines the primary data center, the application path preferences are honored.

Figure 6:
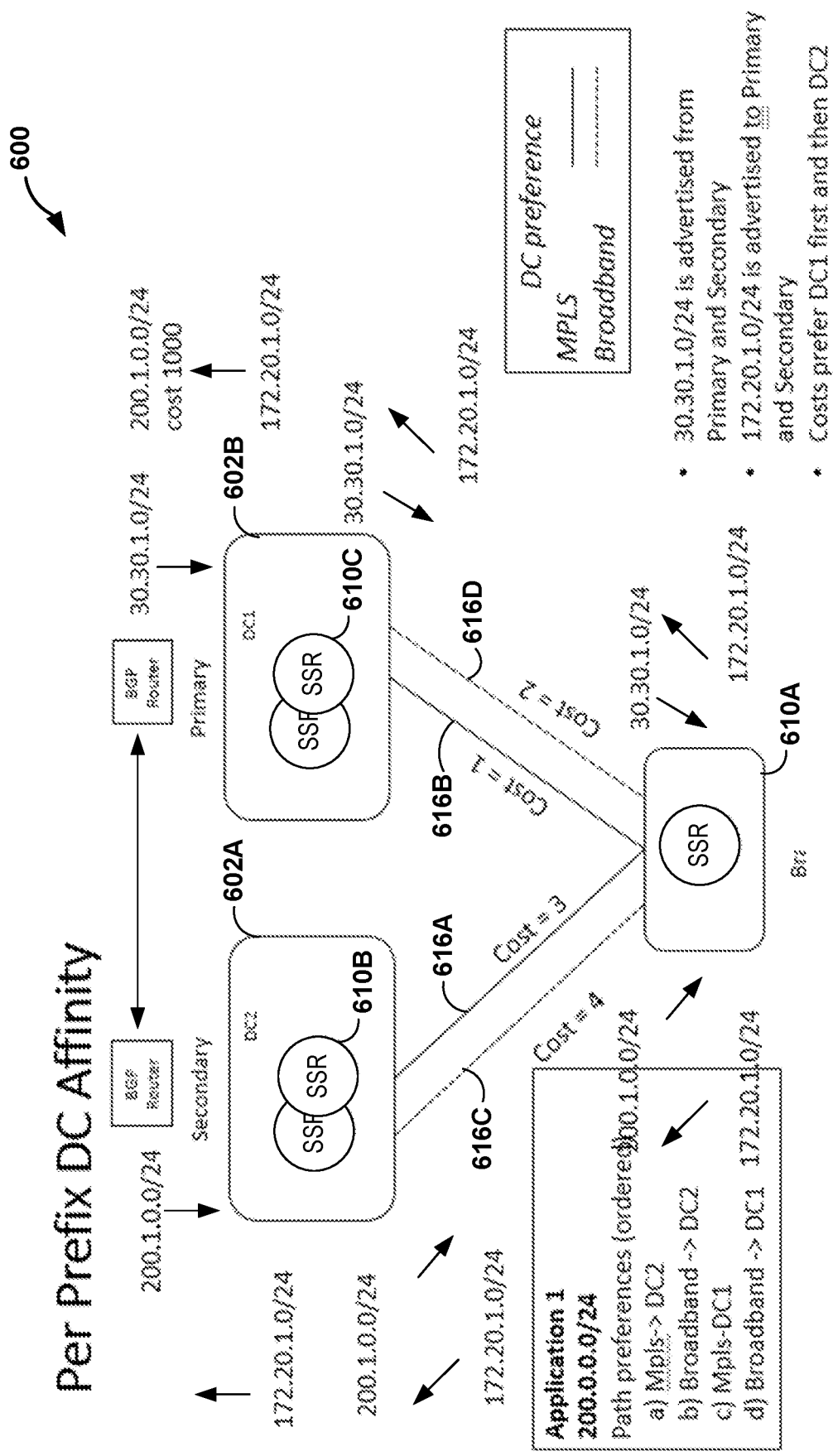
FIG. 6 is a block diagram illustrating an example computer network system in accordance with aspects of the techniques of the disclosure.

FIG. 6 is a block diagram illustrating an example computer network system 600 in accordance with the techniques of the disclosure. More specifically, FIG. 6 illustrates an example where network devices 110 express a preference for a path according to a per-prefix data center (DC) affinity. In some examples, branch network device 610A may apply a preference for a particular prefix on a per-application basis, such that network traffic of each application type of a plurality of different application types may be assigned a corresponding preference for a prefix.

As depicted in the example of FIG. 6, computer network system 600 includes branch network device 610A, peer network device(s) 610B within data center 602A, and peer network device(s) 610C within data center 602B. Branch network device 610A is connected to peer network device(s) 610B within data center 602A via MPLS path 616A and broadband path 616C. Branch network device 610A is connected to peer network device(s) 610C within data center 602B via MPLS path 616B and broadband path 616D (paths 616A-616D are collectively referred to as "paths 616").

Based on the per-prefix data center affinity, it is desirable for branch network device 610A to prefer data center 602A for prefix 200.1.0.0/24 and data center 602B for prefix 30.30.1.0/24. Conventionally, there is not a way to indicate this intent. This is a higher-level intent and not just based on each application. Once the data center is selected for a prefix, applications that are within the prefix will follow that path preferences.

As depicted in the example of FIG. 6, in accordance with the techniques of the disclosure, branch network device 610A, which may perform session-based routing, may account for a preference for a particular path type when computing a cost of a route to a next-hop network device 610B, 610C along the path for route advertisement via a routing protocol, such as BGP.

Figure 7B:
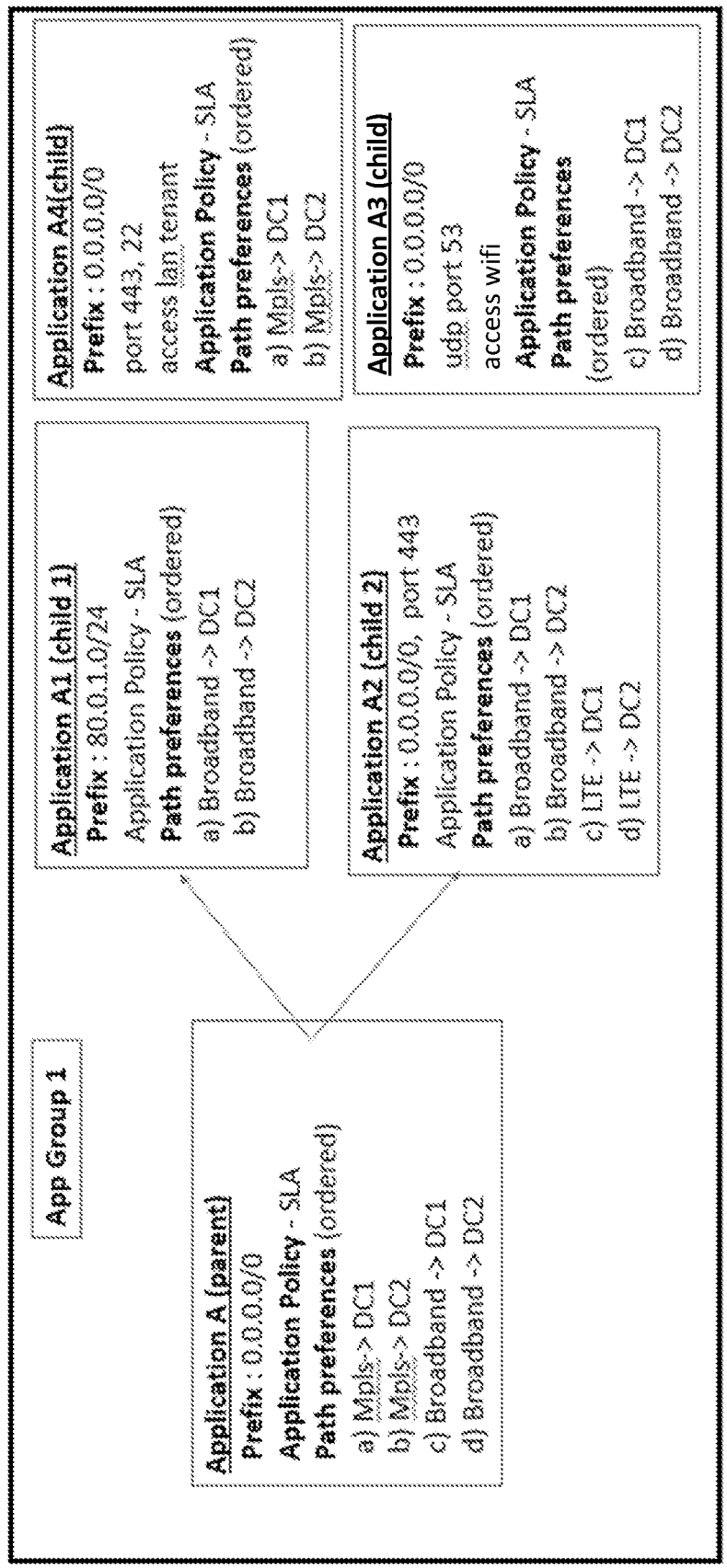
Figure 7C:
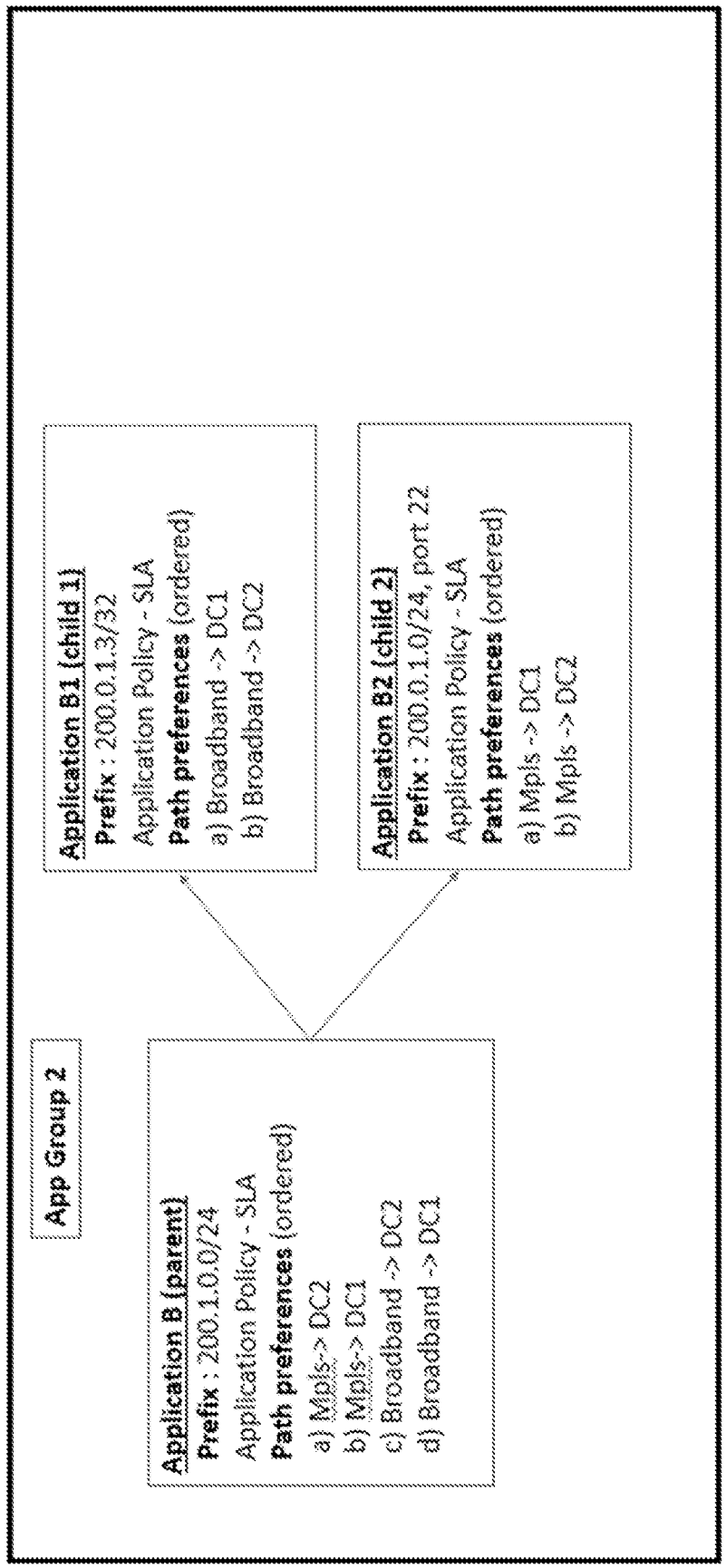

FIGS. 7A-7C are conceptual illustrations depicting various example definitions for path affinity on a per-application basis in accordance with aspects of the techniques of the disclosure. FIGS. 7A-7C are described with respect to computer network system 400 of FIGS. 4A-4B for convenience. However, the techniques of the disclosure may equally be applied to computer network system 2 of FIG. 1, computer network system 500 of FIGS. 5A-5B, or computer network system 600 of FIG. 6.

FIG. 7A depicts an example where three different applications (Application 1, Application 2, and Application 3) each specify preferences for different paths on a per-prefix basis. FIG. 7A illustrates that three applications may be associated with different path preferences on a per-prefix basis. In some examples, FIG. 7A depicts a common approach for expressing the intent to select a data center based on a per-Prefix path preference to determine a data center. A network device, such as branch network device 410A, may account for the preference for a particular path type when computing a cost of a route to a next-hop network device 610B, 610C along the path for route advertisement via a routing protocol. Furthermore, the advertised route may be specific to a particular application, such that the different preferences of Application 1, Application 2, and Application 3 may for different paths may be expressed when branch network device 410A advertises a cost of the route for traffic of a respective application. The following describes a per-prefix path preference approach for 3 different types of applications. These definitions may be defined like an application, but may be identified as a driver application.

Application 1 (Parent 1)
   Prefix: 0.0.0.0/0
   Application Policy-SLA
   Path preferences (ordered)
   a) Mpls→DC1
   b) Mpls→DC2
   c) Broadband→DC1
   d) Broadband→DC2
Application 2 (Parent 2)
   Prefix: 200.1.0.0/24
   Application Policy-SLA
   Path preferences (ordered)
   a) Mpls→DC2
   b) Mpls→DC1
   c) Broadband→DC2
   d) Broadband→DC1
Application 3 (Parent 3)
   Prefix: 80.0.1.0/24
   Application Policy-SLA
   Path preferences (ordered)
   a) Broadband→DC1
   b) Broadband→DC2

FIGS. 7B-7C illustrate two different application groups, Application Group 1 and Application Group 2. As depicted in the example of FIGS. 7B-7C, the applications of FIG. 7A may be grouped into sets of applications (e.g., "application groups"), wherein each application group is assigned different path preferences on a per-prefix basis. In addition, a parent application may inherit the path preference on a per-prefix basis of the respective application group, while each child application may either inherit the path preference on a per-prefix basis of the respective application group or alternatively, may be configured with different path preferences on a per-prefix basis from the respective application group.

FIG. 7B depicts an example where parent and child applications of Application Group 1 may specify preferences for different paths on a per-prefix basis. As depicted in the example of FIG. 7B, a child application may inherit the path preferences of a parent application, or may specify its own specific path preferences. The following describes a per-prefix path preference approach for a parent application A, which has 4 child applications A1, A2, A3, and A4.

Application A (Parent)
   Prefix: 0.0.0.0/0
   Application Policy-SLA
   Path preferences (ordered)
   a) Mpls→DC1
   b) Mpls→DC2
   c) Broadband→DC1
   d) Broadband→DC2
Application A1 (Child 1)
   Prefix: 80.0.1.0/24
   Application Policy-SLA
   Path preferences (ordered)
   a) Broadband→DC1
   b) Broadband→DC2
Application A2 (Child 2)
   Prefix: 0.0.0.0/0, port 443
   Application Policy-SLA
   Path preferences (ordered)
   a) Broadband→DC1
   b) Broadband→DC2
   c) LTE→DC1
   d) LTE→DC2
Application A3 (Child)
   Prefix: 0.0.0.0/0
   udp port 53
   access wifi
   Application Policy-SLA
   Path preferences (ordered)
   c) Broadband→DC1
   d) Broadband→DC2
Application A4 (Child)
   Prefix: 0.0.0.0/0
   port 443, 22
   access lan tenant
   Application Policy-SLA
   Path preferences (ordered)
   a) Mpls→DC1
   b) Mpls→DC2

FIG. 7C depicts another example where parent and child applications of Application Group 2 may specify preferences for different paths on a per-prefix basis. The configuration of path preferences for the applications of Application Group 2 of FIG. 7C may be similar or different from the configuration of path preferences for the applications of Application Group A of FIG. 7B. As depicted in the example of FIG. 7C, a child application may inherit the path preferences of a parent application, or may specify its own specific path preferences. The following describes a per-prefix path preference approach for a parent application B, which has 2 child applications B1 and B2.

Application B (Parent)
  Prefix: 200.1.0.0/24
  Application Policy-SLA
  Path preferences (ordered)
    a) Mpls→DC2
    b) Mpls→DC1
    c) Broadband→DC2
    d) Broadband→DC1
Application B1 (Child 1)
  Prefix: 200.0.1.3/32
  Application Policy-SLA
  Path preferences (ordered)
    a) Broadband→DC1
    b) Broadband→DC2
Application B2 (Child 2)
  Prefix: 200.0.1.0/24, port 22
  Application Policy-SLA
  Path preferences (ordered)
    a) Mpls→DC1
    b) Mpls→DC2

Figure 8A:
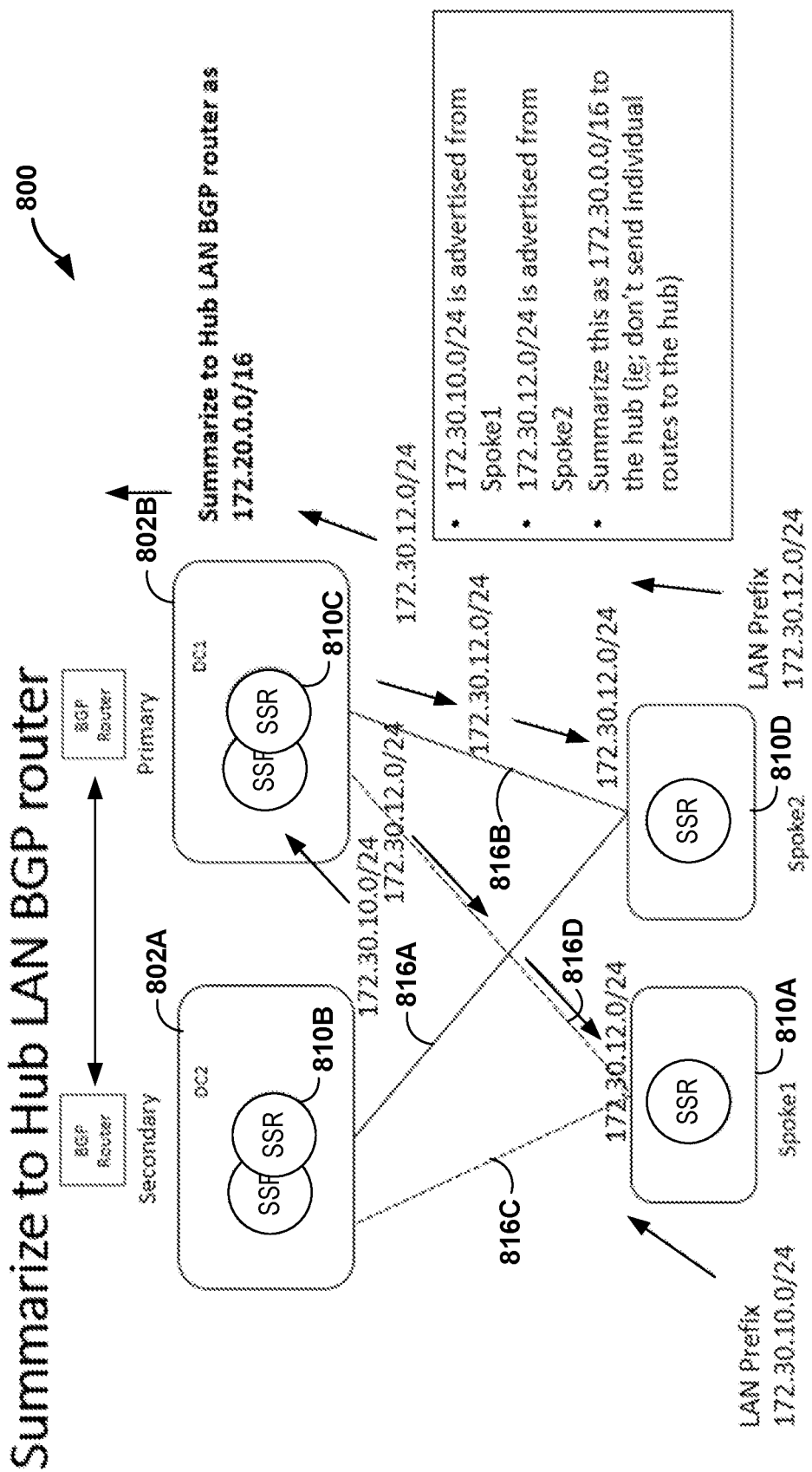
FIGS. 8A-8B are block diagrams illustrating an example computer network system in accordance with aspects of the techniques of the disclosure. Like reference characters refer to like elements throughout the figures and description.
Figure 8B:
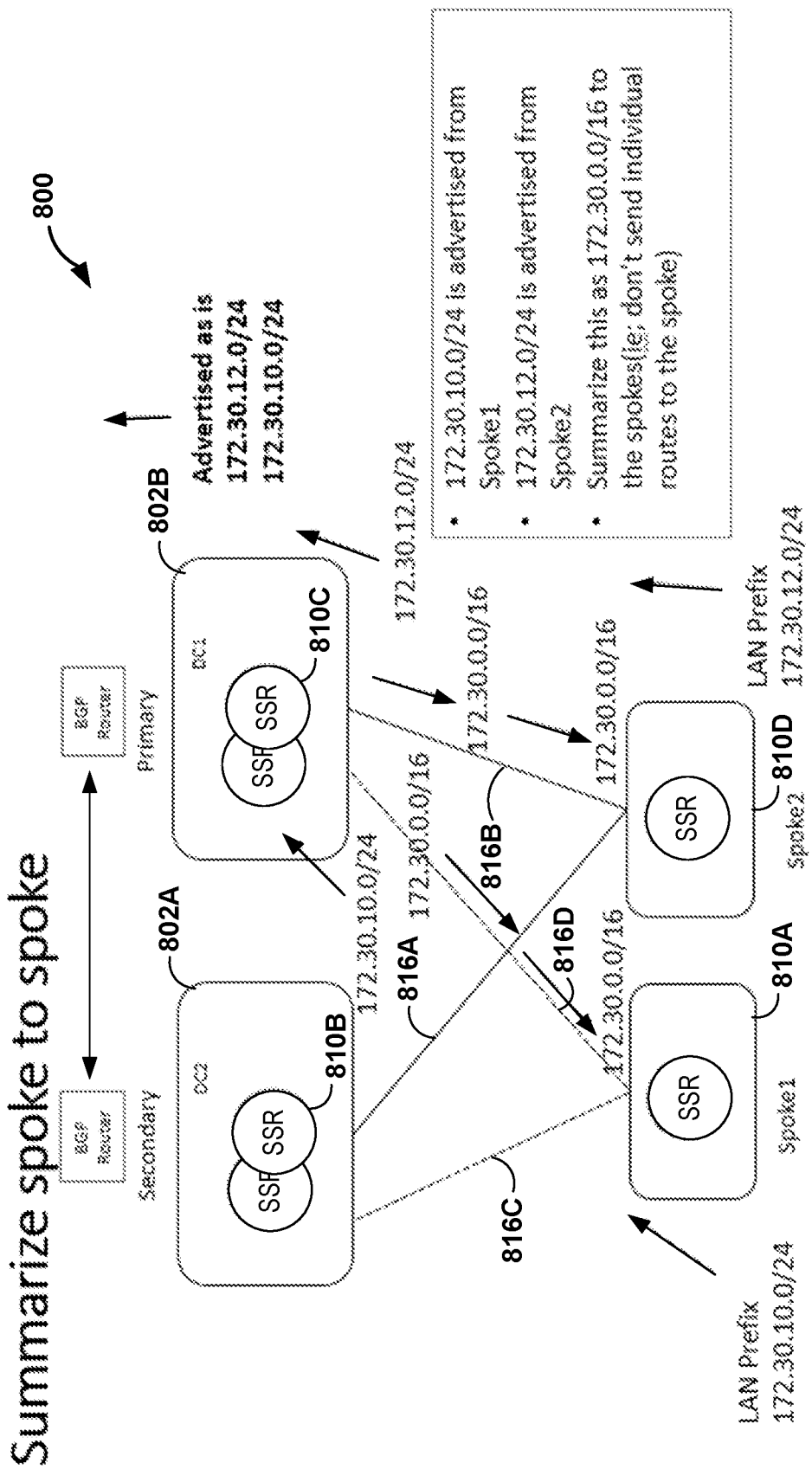

FIGS. 8A-8B are block diagrams illustrating different use cases for an example computer network system 800 in accordance with the techniques of the disclosure. More specifically, FIG. 8 illustrates an example including multiple branch network devices 810A and 810D.

As depicted in the example of FIGS. 8A-8B, computer network system 800 includes branch network device 810A, peer network device(s) 810B within data center 802A, peer network device(s) 810C within data center 602B, and branch network device 810D. Branch network device 810A is connected to peer network device(s) 810B within data center 802A via broadband path 816C and to peer network device(s) 810C within data center 802B via broadband path 816D. Branch network device 810D is connected to peer network device(s) 810B within data center 802A via MPLS 816A and to peer network device(s) 810C within data center 802B via MPLS path 816B (paths 816A-816D are collectively referred to as "paths 816").

FIG. 8A depicts a first use case for summarizing routes to a Hub LAN BGP network device. In this example, it is desirable to provide an intent that only the summarized route needs to be advertised to the Hub LAN. Individual routes from the spoke (e.g., branch network devices 810A, 810D), are advertised to the Hub LAN. However, this does not define the advertisement of individual routes from hub to spoke, which are not summarized. A prefix for branch network device 810A (e.g., spoke 1 in FIG. 8A) is advertised to branch network device 810D (e.g., spoke 2 in FIG. 8A) via the hub. A prefix for branch network device 810D (e.g., spoke 2 in FIG. 8A) is advertised to branch network device 810A (e.g., spoke 1 in FIG. 8A) via the hub.

FIG. 8B depicts a second use case for summarizing routes from spoke network device to spoke network device. In this example, it is desirable to provide an intent that only the summarized route needs to be advertised to the spoke network devices (e.g., branch network device 810A and branch network device 810D). The individual routes from a spoke are advertised to the Hub LAN (and are not summarized). However, this does not define the advertisement of individual routes towards the Hub LAN, which are not summarized. A prefix for branch network device 810A (e.g., spoke 1 in FIG. 8B) is advertised as a summary prefix to branch network device 810D (e.g., spoke 2 in FIG. 8B) via the hub. A prefix for branch network device 810D (e.g., spoke 2 in FIG. 8B) is advertised as a summary prefix to branch network device 810A (e.g., spoke 1 in FIG. 8B) via the hub.

In a third use case, an administrator may turn off spoke-to-spoke advertisements. It may be desirable to provide intent that no routes learned from spoke network devices are advertised to other spoke network devices. In this case, the spoke network devices receive routes from only the Hub LAN. The spokes do not learn any routes from other spokes. This is to prevent spoke-to-spoke traffic. This implementation is typically for compliance requirements followed by certain companies.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising processing circuitry and a storage device, wherein the processing circuitry has access to the storage device and is configured to:
  compute, based at least in part on (1) one or more metrics for a route to a next-hop network device along a path to a destination and (2) a preconfigured preference for a path type of the path to the destination in comparison to path types of other paths to the destination, a cost of the route; and
  send, via a routing protocol, a route advertisement for the route, wherein the route advertisement includes data indicative of the cost of the route.

2. The computing system of claim 1, wherein to compute the cost of the route, the processing circuitry is configured to:
- determine, based at least in part on the one or more metrics for the route to the next-hop network device, the cost of the route; and
- adjust, based at least in part on the preconfigured preference for the path type of the path to the destination, the cost of the route.

3. The computing system of claim 1, wherein the processing circuitry is further configured to compute the cost based further on (3) a latency of the path to the destination in comparison to latencies of other paths to the destination.

4. The computing system of claim 1,
- wherein the path comprises a first path to the destination, and
- wherein the processing circuitry is configured to perform the computing and the sending in response to detecting a failure of a second path to the destination, wherein at least one network device forming the first path is different from at least one network device forming the second path.

5. The computing system of claim 1,
- wherein to compute the cost of the route, the processing circuitry is configured to compute a cost of each of a plurality of routes, each route to a respective next-hop network device along a respective path of a plurality of different paths to the destination, wherein at least two of the plurality of paths traverse different data centers of a plurality of geographically separate data centers, wherein the plurality of different paths comprises the path and the other paths to the destination, and
- wherein the respective cost of each respective route of the plurality of routes is based at least in part on (1) one or more respective metrics for the respective route to the respective next-hop network device along the respective path of the plurality of different paths to the destination and (2) a preconfigured preference for a path type of the respective path of the plurality of different paths to the destination.

6. The computing system of claim 1,
- wherein to compute the cost of the route, the processing circuitry is configured to:
  - determine, based at least in part one or more first metrics for a first route to a first next-hop network device along a first path to the destination, a first cost of the first route;
  - determine, based at least in part one or more second metrics for a second route to a second next-hop network device along a second path to the destination, a second cost of the second route, wherein the first cost of the first route is greater than the second cost of the second route;
  - adjust, based at least in part on a preconfigured preference for a first path type of the first path to the destination, the first cost of the first route; and
  - adjust, based at least in part on a preconfigured preference for a second path type of the second path to the destination, the second cost of the second route, wherein the first path type and the second path type are different, and wherein the preconfigured preference for the first path type indicates that the first path type is more preferred and the preconfigured preference for the second path type indicates that the second path type is less preferred, and wherein the adjusted first cost of the first route is less than the adjusted second cost of the second route.

7. The computing system of claim 6,
- wherein the first path type comprises a Multiprotocol Label Switching (MPLS) path type, and
- wherein the second path type comprises a broadband path type.

8. The computing system of claim 1, wherein the routing protocol comprises Border Gateway Protocol (BGP).

9. A method comprising:
- computing, by a computing system comprising processing circuitry and based at least in part on (1) one or more metrics for a route to a next-hop network device along a path to a destination and (2) a preconfigured preference for a path type of the path to the destination in comparison to path types of other paths to the destination, a cost of the route; and
- sending, by the computing system and via a routing protocol, a route advertisement for the route, wherein the route advertisement includes data indicative of the cost of the route.

10. The method of claim 9, wherein computing the cost of the route comprises:
- determining, based at least in part on the one or more metrics for the route to the next-hop network device, the cost of the route; and
- adjusting, based at least in part on the preconfigured preference for the path type of the path to the destination, the cost of the route.

11. The method of claim 9, wherein computing the cost is based further on (3) a latency of the path to the destination in comparison to latencies of other paths to the destination.

12. The method of claim 9,
- wherein the path comprises a first path to the destination, and
- wherein the computing and the sending are in response to detecting a failure of a second path to the destination, wherein at least one network device forming the first path is different from at least one network device forming the second path.

13. The method of claim 9,
- wherein computing the cost of the route comprises computing a cost of each of a plurality of routes, each route to a respective next-hop network device along a respective path of a plurality of different paths to the destination, wherein at least two of the plurality of paths traverse different data centers of a plurality of geographically separate data centers, wherein the plurality of different paths comprises the path and the other paths to the destination, and
- wherein the respective cost of each respective route of the plurality of routes is based at least in part on (1) one or more respective metrics for the respective route to the respective next-hop network device along the respective path of the plurality of different paths to the destination and (2) a preconfigured preference for a path type of the respective path of the plurality of different paths to the destination.

14. The method of claim 9, wherein computing the cost of the route comprises:
- determining, based at least in part one or more first metrics for a first route to a first next-hop network device along a first path to the destination, a first cost of the first route;
- determining, based at least in part one or more second metrics for a second route to a second next-hop network device along a second path to the destination, a second cost of the second route, wherein the first cost of the first route is greater than the second cost of the second route;

adjusting, based at least in part on a preconfigured preference for a first path type of the first path to the destination, the first cost of the first route; and adjusting, based at least in part on a preconfigured preference for a second path type of the second path to the destination, the second cost of the second route, wherein the first path type and the second path type are different, and wherein the preconfigured preference for the first path type indicates that the first path type is more preferred and the preconfigured preference for the second path type indicates that the second path type is less preferred, and wherein the adjusted first cost of the first route is less than the adjusted second cost of the second route.

15. The method of claim 14,
wherein the first path type comprises a Multiprotocol Label Switching (MPLS) path type, and
wherein the second path type comprises a broadband path type.

16. The method of claim 9, wherein the routing protocol comprises Border Gateway Protocol (BGP).

17. Non-transitory, computer-readable media comprising instructions that, when executed, cause processing circuitry of a computing system to:

compute, based at least in part on (1) one or more metrics for a route to a next-hop network device along a path to a destination and (2) a preconfigured preference for a path type of the path to the destination in comparison to path types of other paths to the destination, a cost of the route; and send, via a routing protocol, a route advertisement for the route, wherein the route advertisement includes data indicative of the cost of the route.

18. The computer-readable media of claim 17, wherein the instructions are further configured to cause the processing circuitry to:

determine, based at least in part on the one or more metrics for the route to the next-hop network device, the cost of the route; and adjust, based at least in part on the preconfigured preference for the path type of the path to the destination, the cost of the route.

\* \* \* \* \*